(12) United States Patent
Bar-Zeev et al.

(10) Patent No.: US 11,403,821 B2
(45) Date of Patent: Aug. 2, 2022

(54) CONTEXTUAL COMPUTER-GENERATED REALITY (CGR) DIGITAL ASSISTANTS

(71) Applicant: Apple inc., Cupertino, CA (US)

(72) Inventors: Avi Bar-Zeev, Oakland, CA (US); Golnaz Abdollahian, San Francisco, CA (US); Devin William Chalmers, Oakland, CA (US); David H. Y. Huang, San Mateo, CA (US); Banafsheh Jalali, San Jose, CA (US)

(73) Assignee: APPLE INC., Cupertino, CA (US)

( * ) Notice: Subject to any disclaimer, the term of this patent is extended or adjusted under 35 U.S.C. 154(b) by 94 days.

(21) Appl. No.: 16/577,310

(22) Filed: Sep. 20, 2019

(65) Prior Publication Data

US 2020/0098188 A1 Mar. 26, 2020

Related U.S. Application Data

(60) Provisional application No. 62/735,291, filed on Sep. 24, 2018.

(51) Int. Cl.
| | | |
|---|---|---|
| *G06T 19/00* | (2011.01) | |
| *G02B 27/01* | (2006.01) | |
| *G06F 3/01* | (2006.01) | |

(52) U.S. Cl.
CPC .......... *G06T 19/006* (2013.01); *G02B 27/017* (2013.01); *G06F 3/011* (2013.01)

(58) Field of Classification Search
None
See application file for complete search history.

(56) References Cited

U.S. PATENT DOCUMENTS

| | | | | |
|---|---|---|---|---|
| 2018/0034867 A1* | 2/2018 | Zahn | ...................... | H04L 51/046 |
| 2018/0164877 A1* | 6/2018 | Miller | .................. | H04B 1/3827 |
| 2018/0239144 A1* | 8/2018 | Woods | .................. | A63F 13/212 |
| 2018/0307311 A1* | 10/2018 | Webb | ........................ | G06T 3/40 |

OTHER PUBLICATIONS

K. Nurgaliyev, et al.; "Improved Multi-user Interaction in a Smart Environment Through a Preference-Based Conflict Resolution Virtual Assistant," 2017 International Conference on Intelligent Environments (IE), Aug. 21-25, 2017, pp. 100-107 (Year: 2017).*

* cited by examiner

*Primary Examiner* — Peter Hoang
(74) *Attorney, Agent, or Firm* — Fernando & Partners, LLP

(57) ABSTRACT

In one implementation, a method of providing contextual computer-generated reality (CGR) digital assistant is performed at a device provided to deliver a CGR scene, the device including one or more processors, non-transitory memory, and one or more displays. The method includes obtaining image data characterizing a field of view captured by an image sensor. The method further includes identifying in the image data a contextual trigger for one of a plurality of contextual CGR digital assistants. The method additionally includes selecting a visual representation of the one of the plurality of contextual CGR digital assistants, where the visual representation is selected based on context and in response to identifying the contextual trigger. The method also includes presenting the CGR scene by displaying the visual representation of the one of the plurality of contextual CGR digital assistants, where the visual representation provides information associated with the contextual trigger.

20 Claims, 26 Drawing Sheets

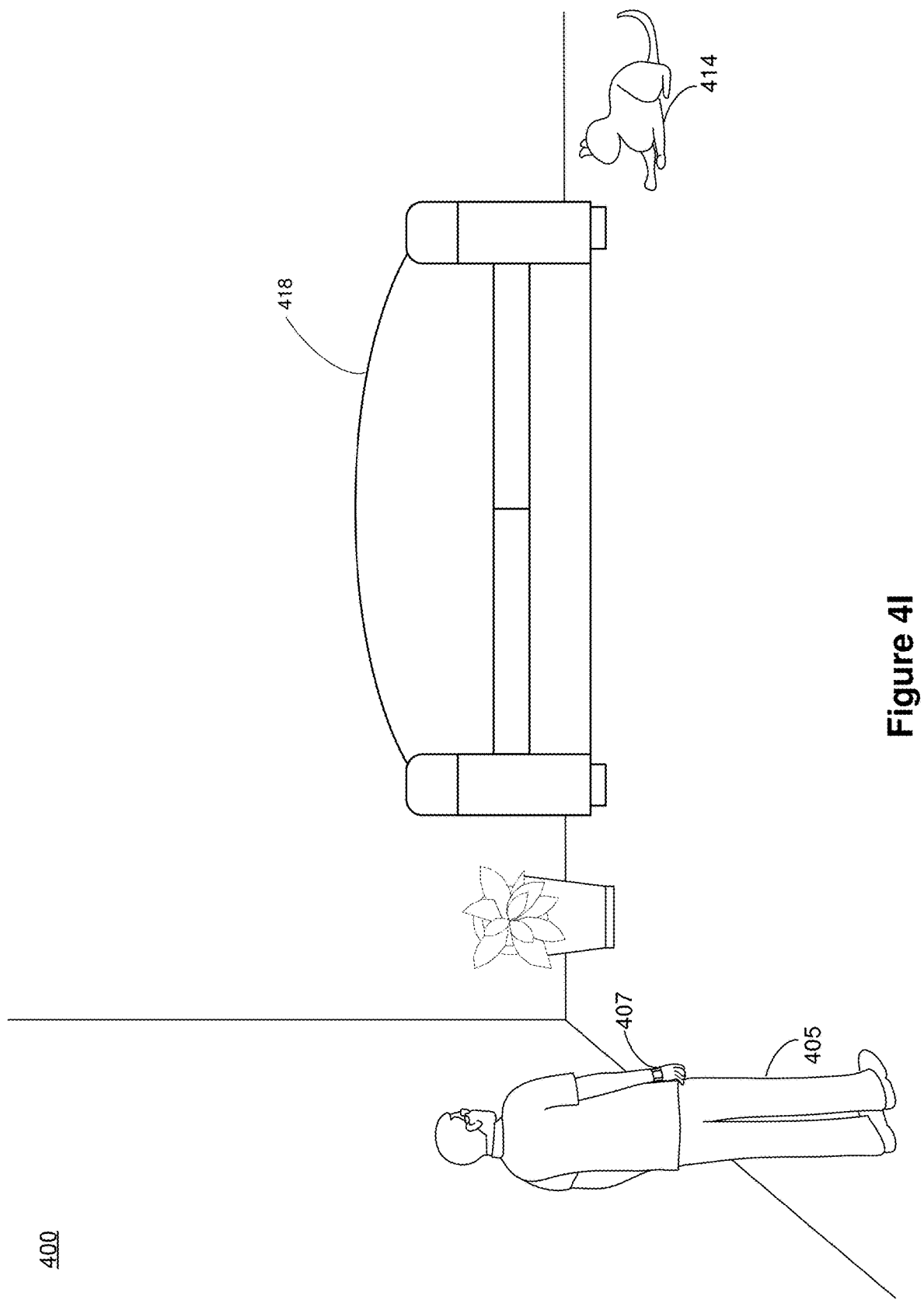

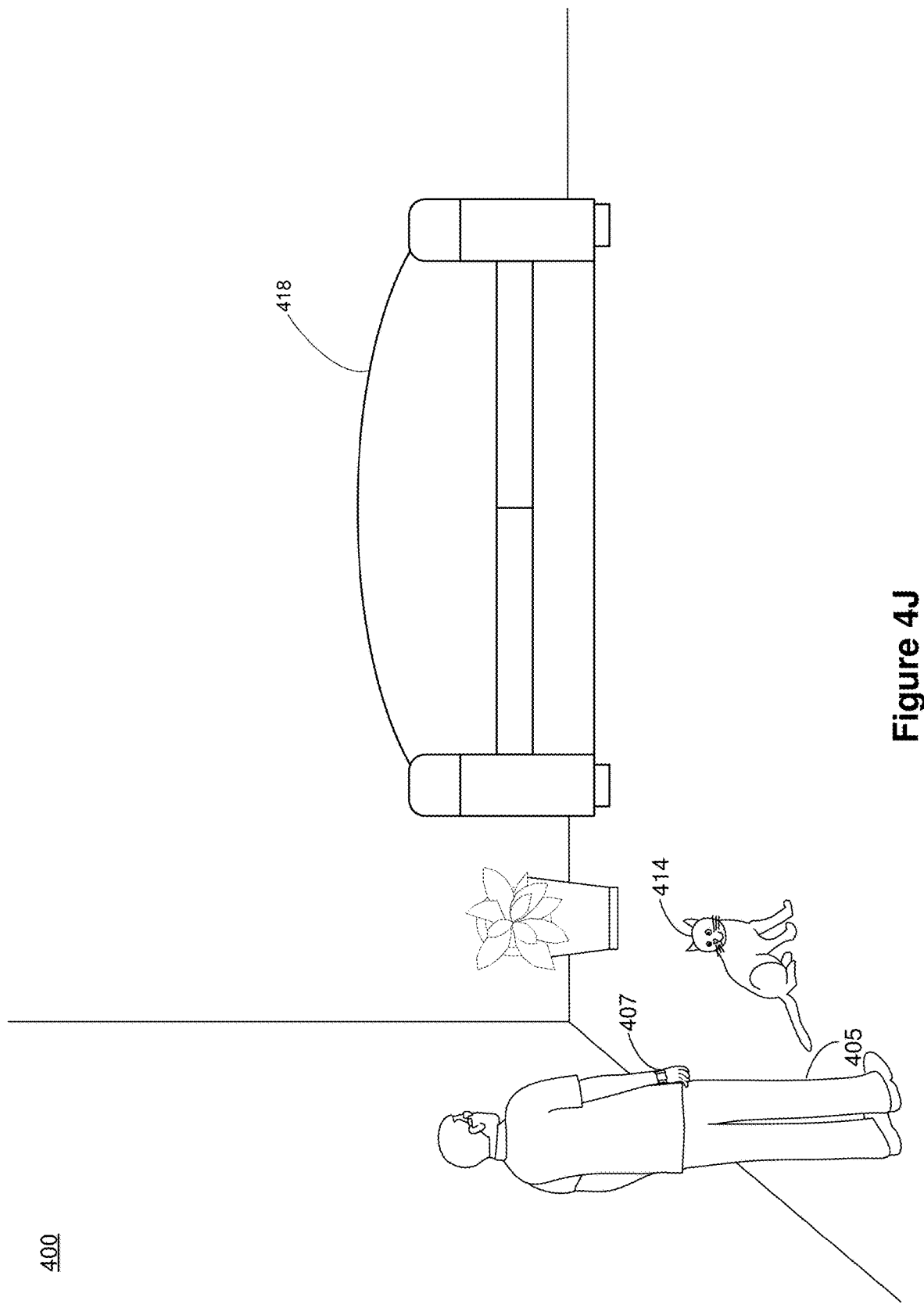

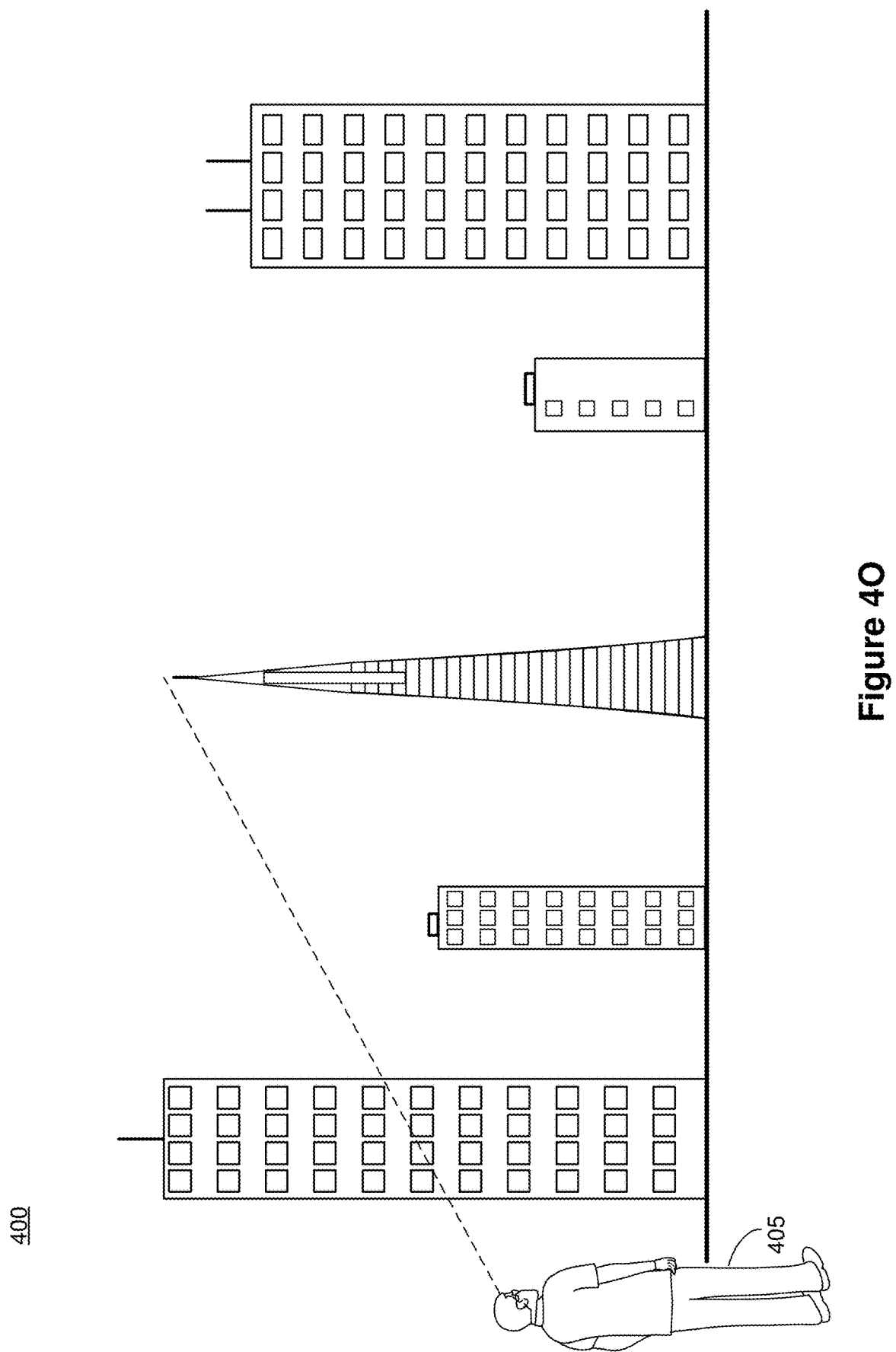

CONTEXTUAL COMPUTER-GENERATED REALITY (CGR) DIGITAL ASSISTANTS

CROSS-REFERENCE TO RELATED APPLICATIONS

This application claims priority to U.S. Provisional Patent App. No. 62/735,291, filed on Sep. 24, 2018, which is hereby incorporated by reference in its entirety.

TECHNICAL FIELD

The present disclosure generally relates to computer-generated reality applications on multifunction devices.

BACKGROUND

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Conventional CGR systems may display many visual notifications, to an extent that overwhelms users.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
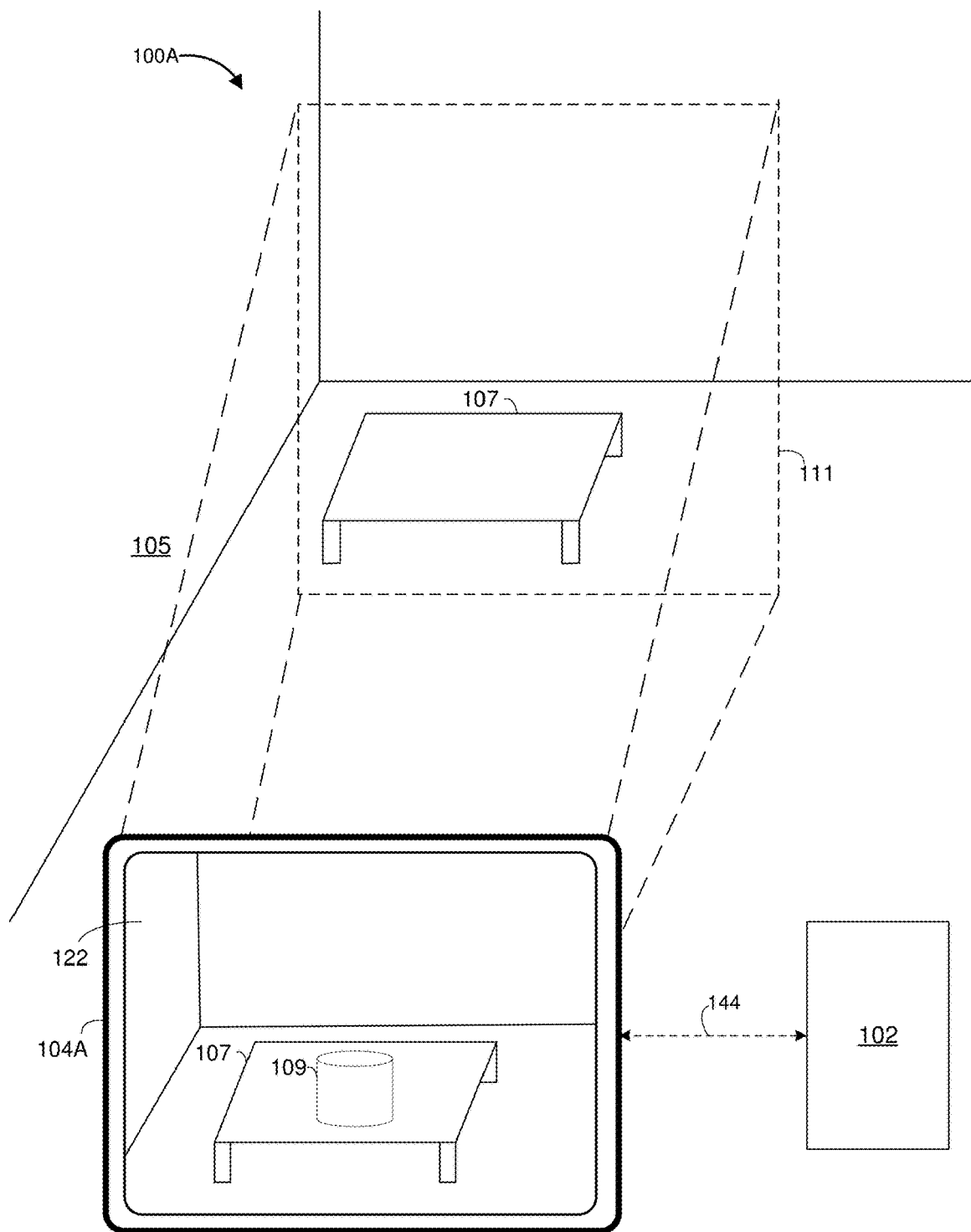
FIGS. 1A-1C are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for providing contextual computer-generated reality (CGR) digital assistant. In various implementations, the method is performed at a device provided to deliver a CGR scene, the device including one or more processors, non-transitory memory, and one or more displays. The method includes obtaining image data characterizing a field of view captured by an image sensor (sometimes referred to as obtaining "pass-through" image data). The method further includes identifying in the image data a contextual trigger for one of a plurality of contextual CGR digital assistants. The method additionally includes selecting a visual representation of the one of the plurality of contextual CGR digital assistants, where the visual representation is selected based on context and in response to identifying the contextual trigger. The method also includes generating the CGR scene by compositing the visual representation of the one of the plurality of contextual CGR digital assistants, where the visual representation provides information associated with the contextual trigger.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

If a computer-generated reality (CGR) system provides too much content to a user, for example in terms of the number and frequency of information being displayed, that content can become overwhelming to the user. Various implementations disclosed herein improve the user's experience by subtly drawing the user's attention to relevant computer-generated media content. In embodiments, contextual CGR digital assistants are composited into a composited reality scene, under appropriate contexts, and provided to a user in response to determining that image data (e.g., image data for content presented and passed through the composited reality scene) includes a contextual trigger. The contextual CGR digital assistants thus assist the user to obtain information from the composited reality scene by subtly drawing the user's attention to relevant computer-generated media content. Further, because representations of the contextual CGR reality digital assistants depend on what people expect a representation to do and/or cultural understanding of what is associated with a particular representation, using the contextual CGR digital assistants to draw the user's attention to information in the composited reality scene provides a natural user experience.

For example, knowing a dog's ability to run fast and fetch items, when the user notices a restaurant (real-world or CGR), a computer-generated dog can be used as a visual representation of a contextual CGR digital to quickly fetch restaurant information for the user. Other examples include displaying a computer-generated cat that leads the user to an interesting place, a computer-generated falcon that flies up and ahead to give plan-view perspectives on an area, a computer-generated parrot that whispers key information, a computer-generated hummingbird or a computer-generated butterfly that points out small details, a computer-generated dolphin that leads the way to a location, etc. Personifying these virtual animals as visual representations of contextual CGR digital assistants allow the user to obtain information from the CGR environment without feeling overwhelmed.

As a non-animal example, in some cultures, the big dipper constellation in the sky provides directions (e.g., cardinal directions). Based on such cultural understandings, a computer-generated big dipper constellation is displayed in the CGR scene as a contextual CGR digital assistant to provide general direction to a faraway place.

In another non-animal example, in a CGR scene, a computer-generated hot air balloon or a computer-generated robot (e.g., a computer-generated drone) floats in the sky. In response to a user's gaze to the sky or a head movement by the user signifying looking up, the computer-generated hot air balloon or the computer-generated robot flies closer to the user in order to provide direction or navigation. In the case of a computer-generated robot on the ground, the computer-generated robot can be a contextual CGR digital assistant to see through obstacles, fetch information from a small space, locate music records, etc. Thus, through the visual representations of these contextual CGR digital assistants, information is subtly conveyed to the user, and the extra capacity and/or ability to acquire the information through these contextual CGR digital assistants empower the user.

FIG. 1A is a block diagram of an example operating architecture 100A in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100A includes an electronic device 104A.

In some implementations, the electronic device 104A is configured to present a CGR experience to a user. In some implementations, the electronic device 104A includes a suitable combination of software, firmware, and/or hardware. According to some implementations, the electronic device 104A presents, via a display 122, a CGR experience to the user while the user is physically present within a physical environment 103 that includes a table 107 in a scene 105 within the field-of-view 111 of the electronic device 104A. As such, in some implementations, the user holds the electronic device 104A in his/her hand(s). In some implementations, while presenting a CGR experience, the electronic device 104A is configured to present CGR content (e.g., a CGR cylinder 109) and to enable video pass-through of the physical environment 103 (e.g., including a representation of the table 107) on a display 122. In some implementations, a controller 102 is communicatively coupled with the CGR device 104A via one or more wired or wireless communication channels 144 (e.g., BLUETOOTH, IEEE 802.11x, IEEE 802.16x, IEEE 802.3x, etc.). The controller 102 is further described below with reference to FIG. 1B.

Figure 1B:
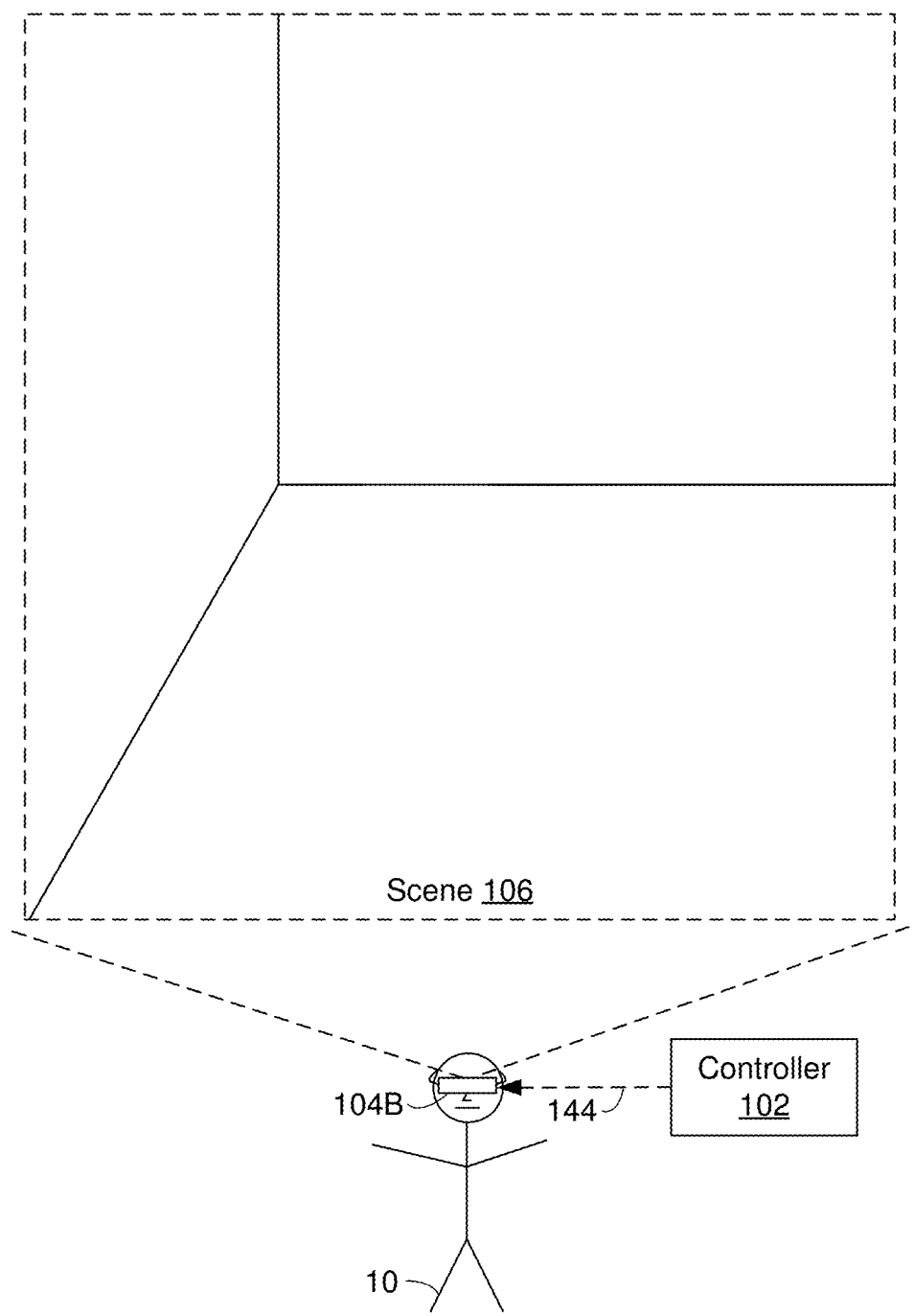

FIG. 1B is a block diagram of an exemplary computer-generated reality (CGR) environment 100B in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

To that end, as a non-limiting example, the CGR environment 100B includes a controller 102 and a CGR device (e.g., a head-mountable device (HMD)) 104B. In the example of FIG. 1B, the CGR device 104B is worn by a user 10. In some implementations, the CGR device 104B corresponds to a head-mountable device (HMD), tablet, mobile phone, wearable computing device, or the like. In some implementations, the CGR device 104B is configured to present a CGR experience to the user 10. In some implementations, the CGR device 104B includes a suitable combination of software, firmware, and/or hardware.

According to some implementations, the CGR device 104B presents a CGR experience to the user 10 while the user 10 is virtually and/or physically present within the scene 106. In some implementations, while presenting an augmented reality (AR) experience, the CGR device 104B is configured to present AR content and to enable video pass-through of the scene 106 (e.g., the CGR device 104B corresponds to a CGR-enabled mobile phone or tablet). In some implementations, while presenting a CGR experience, the CGR device 104B is configured to present CGR content and to enable optical see-through of the scene 106 (e.g., the CGR device 104B corresponds to a CGR-enabled glasses). In some implementations, while presenting a CGR experience, the CGR device 104B is configured to present CGR content and to optionally enable video pass-through of the scene 106 (e.g., the CGR device 104B corresponds to a CGR-enabled HMD).

In some implementations, the user 10 wears the CGR device 104B on his/her head (e.g., as shown in FIG. 1). As such, the CGR device 104B includes one or more CGR displays provided to display the CGR content. For example, the CGR device 104B encloses the field-of-view of the user 10. In some implementations, the CGR device 104B is replaced with a CGR chamber, enclosure, or room configured to present CGR content in which the user 10 does not wear the CGR device 104B. In some implementations, the user 10 holds the CGR device 104B in his/her hand(s).

In some implementations, the controller 102 is configured to manage and coordinate a CGR experience for a user 10. In some implementations, the controller 102 includes a suitable combination of software, firmware, and/or hardware. In some implementations, the controller 102 is a computing device that is local or remote relative to the scene 106. For example, the controller 102 is a local server located within the scene 106. In another example, the controller 102 is a remote server located outside of the scene 106 (e.g., a cloud server, central server, etc.). In some implementations, the controller 102 is communicatively coupled with the CGR device 104B via one or more wired or wireless communication channels 144 (e.g., BLUETOOTH, IEEE 802.11x, IEEE 802.16x, IEEE 802.3x, etc.). In some implementations, the functionalities of the controller 102 are provided by and/or combined with the CGR device 104B.

As illustrated in FIG. 1B, the CGR device 104B presents a scene 106. In some implementations, the scene 106 is generated by the controller 102 and/or the CGR device 104B. In some implementations, the scene 106 includes a computer-generated scene that is a simulated replacement of a real-world scene. In other words, in some implementations, the scene 106 is simulated by the controller 102 and/or the CGR device 104B. In such implementations, the scene 106 is different from the real-world scene where the CGR device 104B is located. In some implementations, the scene 106 includes an augmented scene that is a modified version of a real-world scene. For example, in some implementations, the controller 102 and/or the CGR device 104B modify (e.g., augment) the real-world scene where the CGR device 104B is located in order to generate the scene 106. In some implementations, the controller 102 and/or the CGR device 104B generate the scene 106 by simulating a replica of the real-world scene where the CGR device 104B is located. In some implementations, the controller 102 and/or the CGR device 104B generate the scene 106 by removing and/or adding items from the simulated replica of the real-world scene where the CGR device 104B is located.

Figure 1C:
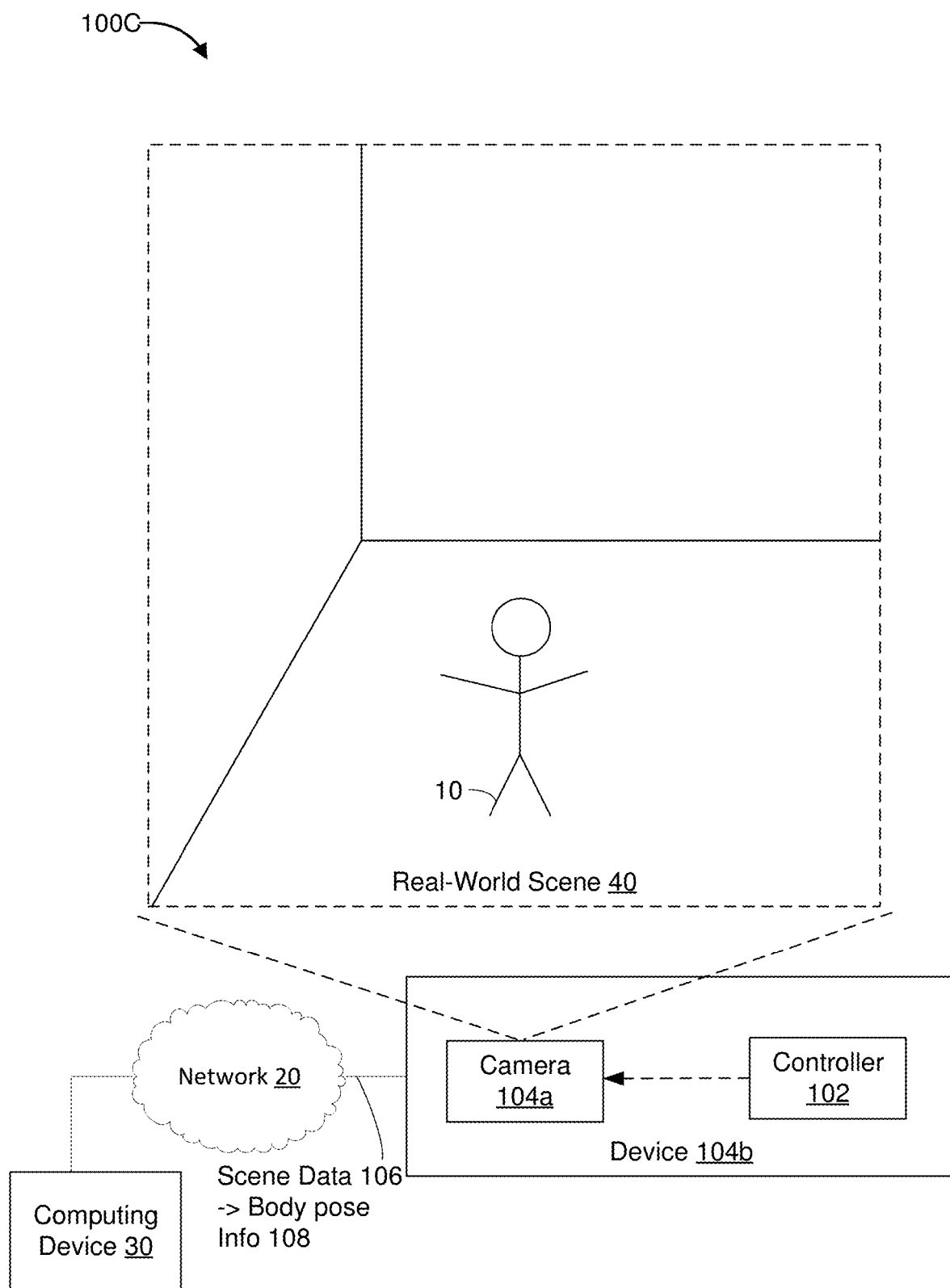

Referring to FIG. 1C, FIG. 1C is a diagram of an example operating environment 100C in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100C includes a network 20, a computing device 30, a real-world scene 40, and a device 104d.

In the example of FIG. 1C, the real-world scene 40 includes a person 10. In various implementations, the device 104d captures a set of images of the real-world scene 40 and transmits data representing the scene 106 to the computing device 30 over the network 20. In some implementations, the device 104d includes the controller 102 and a camera 104c. In some implementations, the camera 104c captures the set of images, and the controller 102 generates the scene data 106 based on the set of images. In some implementations, the scene data 106 includes body pose information 108 for the person 10 that is in a field of view of the camera 104c.

In various implementations, the body pose information 108 indicates body poses of the person 10 that is in the field of view of the camera 104c. For example, in some implementations, the body pose information 108 indicates joint positions and/or joint orientations of the person 10 (e.g., positions/orientations of shoulder joints, elbow joints, wrist joints, pelvic joint, knee joints and ankle joints). In some implementations, the body pose information 108 indicates positions/orientations of various body portions of the person 10 (e.g., positions/orientations of head, torso, upper arms, lower arms, upper legs and lower legs).

In various implementations, transmitting the body pose information 108 over the network 20 consumes less bandwidth than transmitting images captured by the camera 104c. In some implementations, network resources are limited, and the device 104d has access to an available amount of bandwidth. In such implementations, transmitting the body pose information 108 consumes less than the available amount of bandwidth, whereas transmitting images captured by the camera 104c may consume more than the available amount of bandwidth. In various implementations, transmitting the body pose information 108 (e.g., instead of transmitting images) improves the operability of the network 20, for example, by utilizing fewer network resources (e.g., by utilizing less bandwidth).

In some implementations, the computing device 30 utilizes the body pose information 108 to render an avatar of the person 10. For example, in some implementations, the computing device 30 provides the body pose information 108 to a display engine (e.g., a rendering and display pipeline) that utilizes the body pose information 108 to render the avatar in a computer-generated scene. Since the computing device 30 utilizes the body pose information 108 to render the avatars, the body pose of the avatars is within a degree of similarity to the body pose of the person 10 at the real-world scene 40. As such, viewing the avatar in the computer-generated scene is within a degree of similarity to viewing the images of the real-world scene 40.

Figure 2:
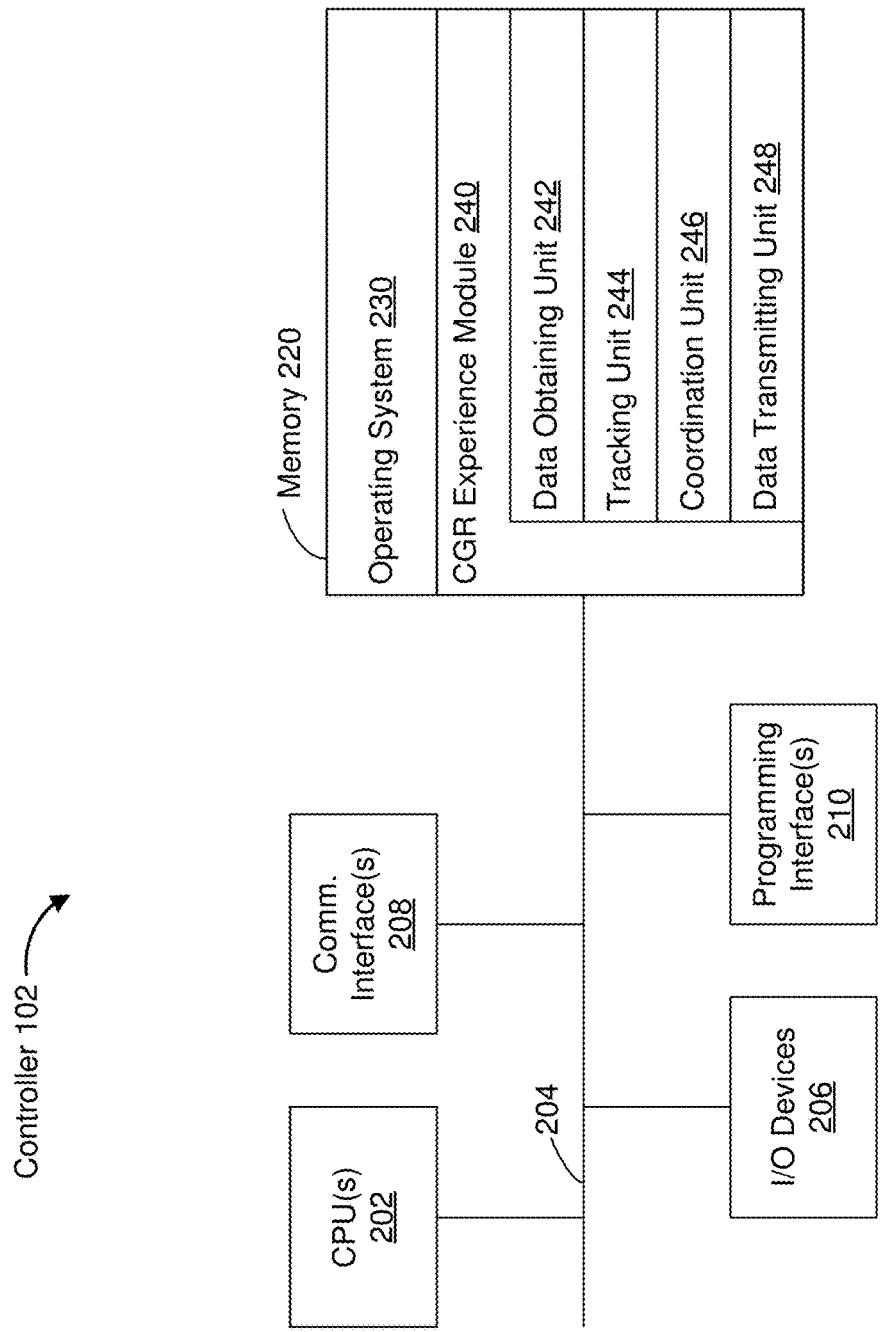
FIG. 2 is a block diagram of an example controller in accordance with some implementations.

FIG. 2 is a block diagram of an example of the controller 102 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 102 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a CGR experience module 240.

The operating system 230 includes procedures for handling various basic system services and for performing hardware dependent tasks. In some implementations, the CGR experience module 240 is configured to manage and coordinate one or more CGR experiences for one or more users (e.g., a single CGR experience for one or more users, or multiple CGR experiences for respective groups of one or more users). To that end, in various implementations, the CGR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the CGR device 104. To that end, in various implementations, the data obtaining unit 242 includes instructions and/or logic therefor, and heuristics and metadata therefor.

In some implementations, the tracking unit 244 is configured to map the scene 105 (FIG. 1A) and/or to track the position/location of at least the CGR device 104 with respect to the scene 106 (FIG. 1B). To that end, in various implementations, the tracking unit 244 includes instructions and/or logic therefor, and heuristics and metadata therefor.

In some implementations, the coordination unit 246 is configured to manage and coordinate the CGR experience presented to the user by the CGR device 104. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the CGR device 104. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 102), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
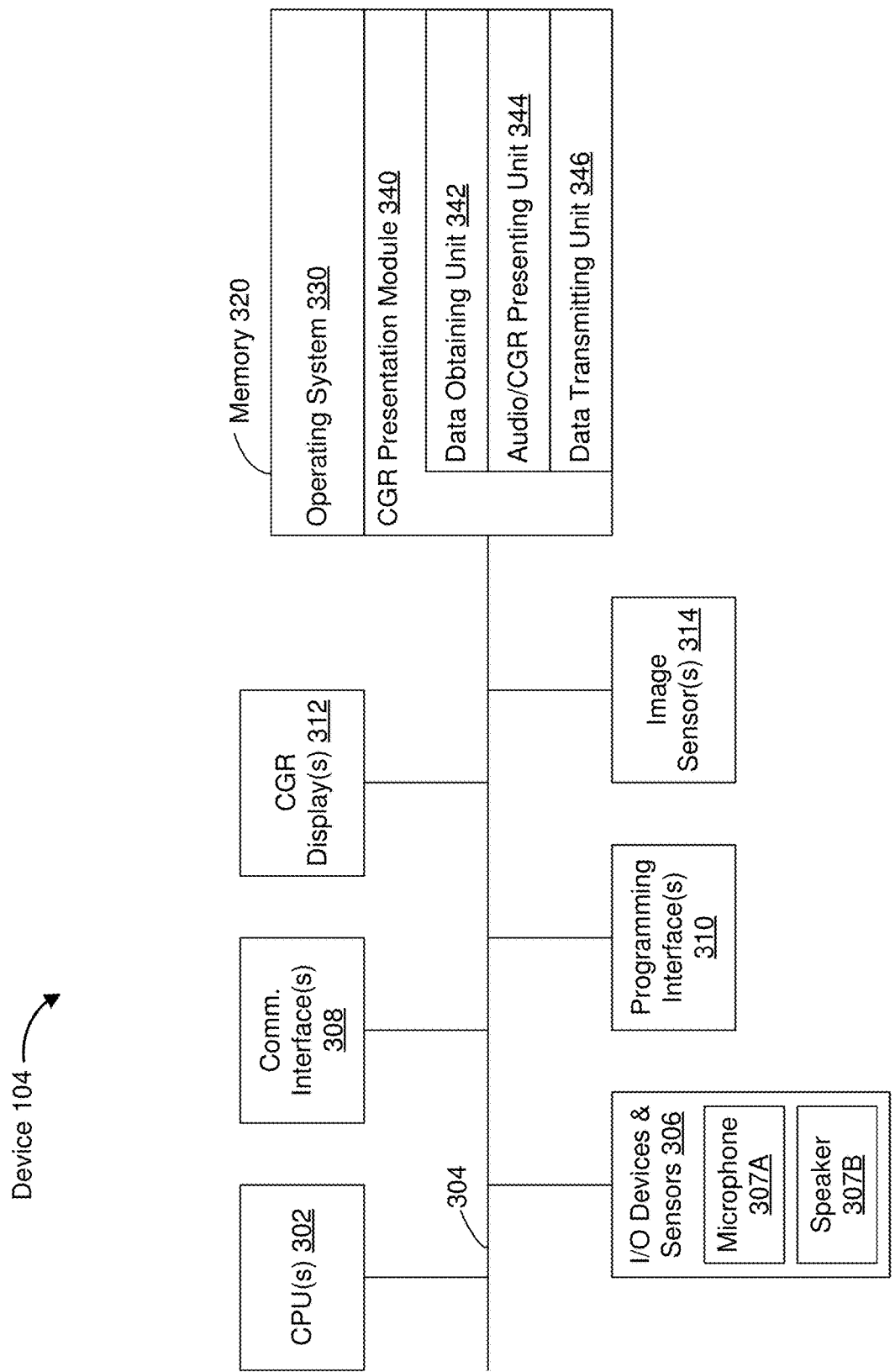
FIG. 3 is a block diagram of an example head-mounted device (HMD) in accordance with some implementations.

FIG. 3 is a block diagram of an example of the CGR device 104 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the CGR device 104 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more interior and/or exterior facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones 307A, one or more speakers 307B (e.g., headphones or loudspeakers), a haptics engine, one or more depth sensors (e.g., a structured light, a time-of-flight, or the like), and/or the like.

In some implementations, the one or more CGR displays 312 are configured to provide the CGR experience to the user. In some implementations, the one or more CGR displays 312 correspond to holographic, digital light processing (DLP), liquid-crystal display (LCD), liquid crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more CGR displays 312 correspond to diffractive, reflective, polarized, holographic waveguide displays and/or the like. For example, the CGR device 104 includes a single CGR display. In another example, the CGR device 104 includes a CGR display for each eye of the user. In some implementations, the one or more CGR displays 312 are capable of presenting CGR content.

In some implementations, the one or more interior, exterior, inward, outward, front, and/or back facing image sensors 314 are configured to obtain image data that corresponds to at least a portion of the face of the user that includes the eyes of the user (any may be referred to as an eye-tracking camera). In some implementations, the one or more interior, exterior, inward, outward, front, and/or back facing image sensors 314 are configured to be forward-facing (or outward facing) so as to obtain image data that corresponds to the scene as would be viewed by the user if the CGR device 104 was not present (and may be referred to as an outward facing camera). The one or more interior, exterior, inward, outward, front, and/or back facing image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an CGR presentation module 340.

The operating system 330 includes procedures for handling various basic system services and for performing hardware dependent tasks. In some implementations, the CGR presentation module 340 is configured to present CGR content to the user via the one or more CGR displays 312. To that end, in various implementations, the CGR presentation module 340 includes a data obtaining unit 342, an audio/CGR presenting unit 344, and a data transmitting unit 346.

In some implementations, the data obtaining unit 342 is configured to obtain data (e.g., presentation data, interaction data, sensor data, location data, etc.) from one or more of the controller 102 (e.g., via the one or more communication interfaces 308), the one or more I/O devices and sensors 306, or the one or more interior, exterior, inward, outward, front, and/or back facing image sensors 314. To that end, in various implementations, the data obtaining unit 342 includes instructions and/or logic therefor, and heuristics and metadata therefor.

In some implementations, the audio/CGR presenting unit 344 is configured to present an audio/CGR experience via the one or more CGR displays 312 (and, in various implementations, the speaker 307B and/or microphone 307A). To that end, in various implementations, the audio/CGR presenting unit 344 includes instructions and/or logic therefor, and heuristics and metadata therefor.

In some implementations, the data transmitting unit 346 is configured to transmit data (e.g., presentation data, location data, etc.) to at least the controller 102. To that end, in various implementations, the data transmitting unit 346 includes instructions and/or logic therefor, and heuristics and metadata therefor.

Although the data obtaining unit 342, the audio/CGR presenting unit 344, and the data transmitting unit 346 are shown as residing on a single device (e.g., the CGR device 104), it should be understood that in other implementations, any combination of the data obtaining unit 342, the audio/CGR presenting unit 344, and the data transmitting unit 346 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
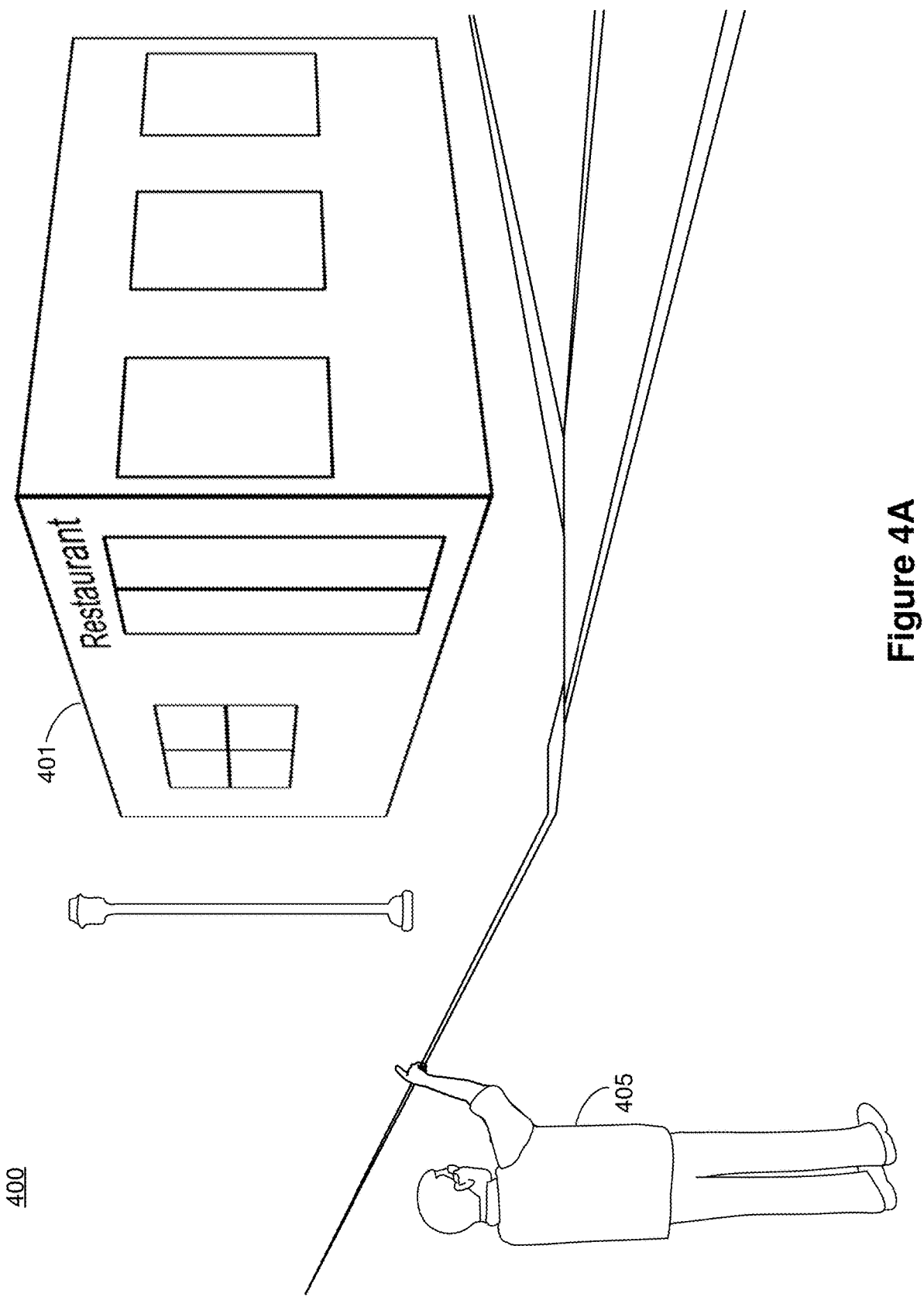
FIGS. 4A-4T illustrate an exemplary computer-generated reality (CGR) environment in accordance with some implementations.
Figure 4B:
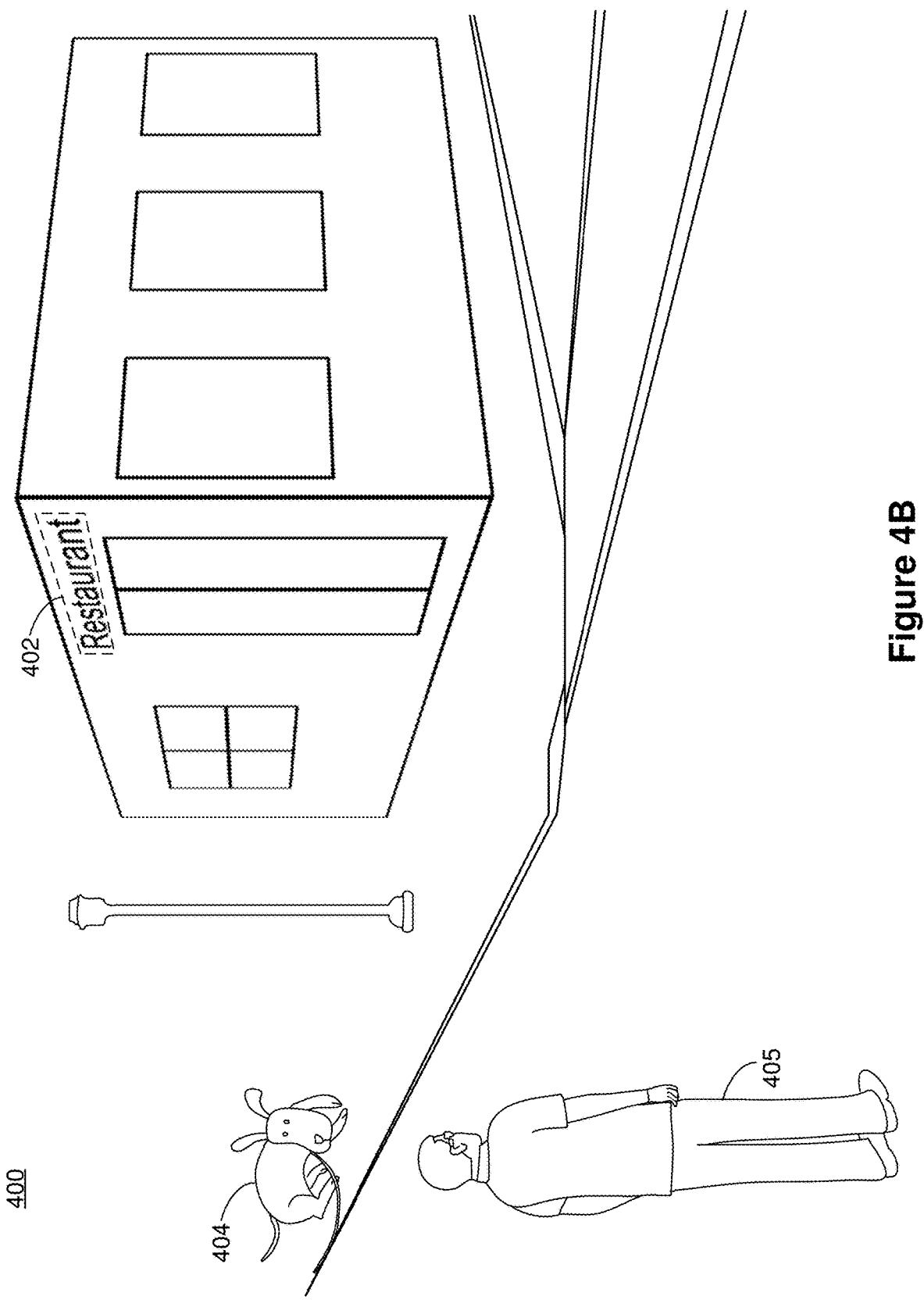
Figure 4C:
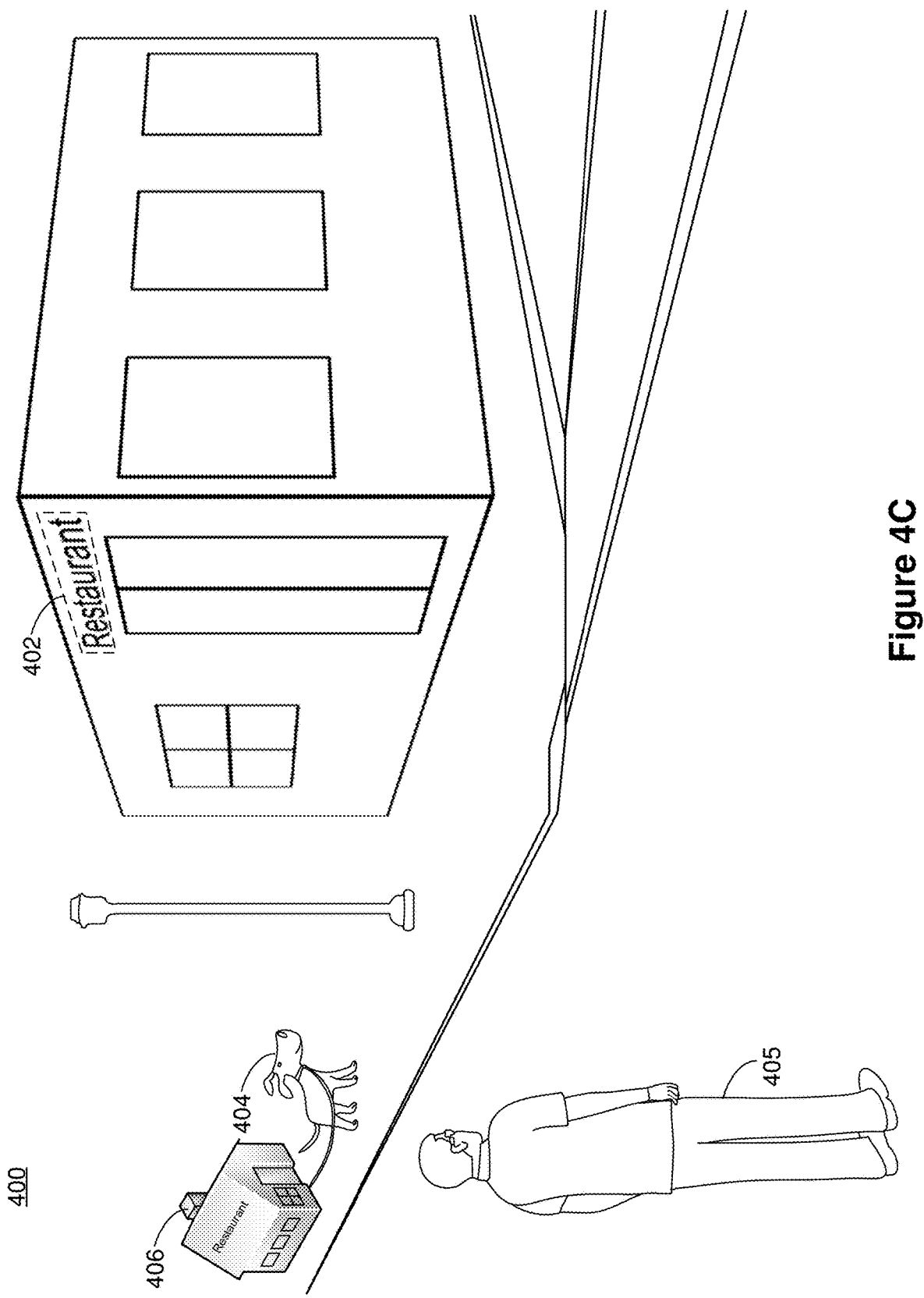
Figure 4D:
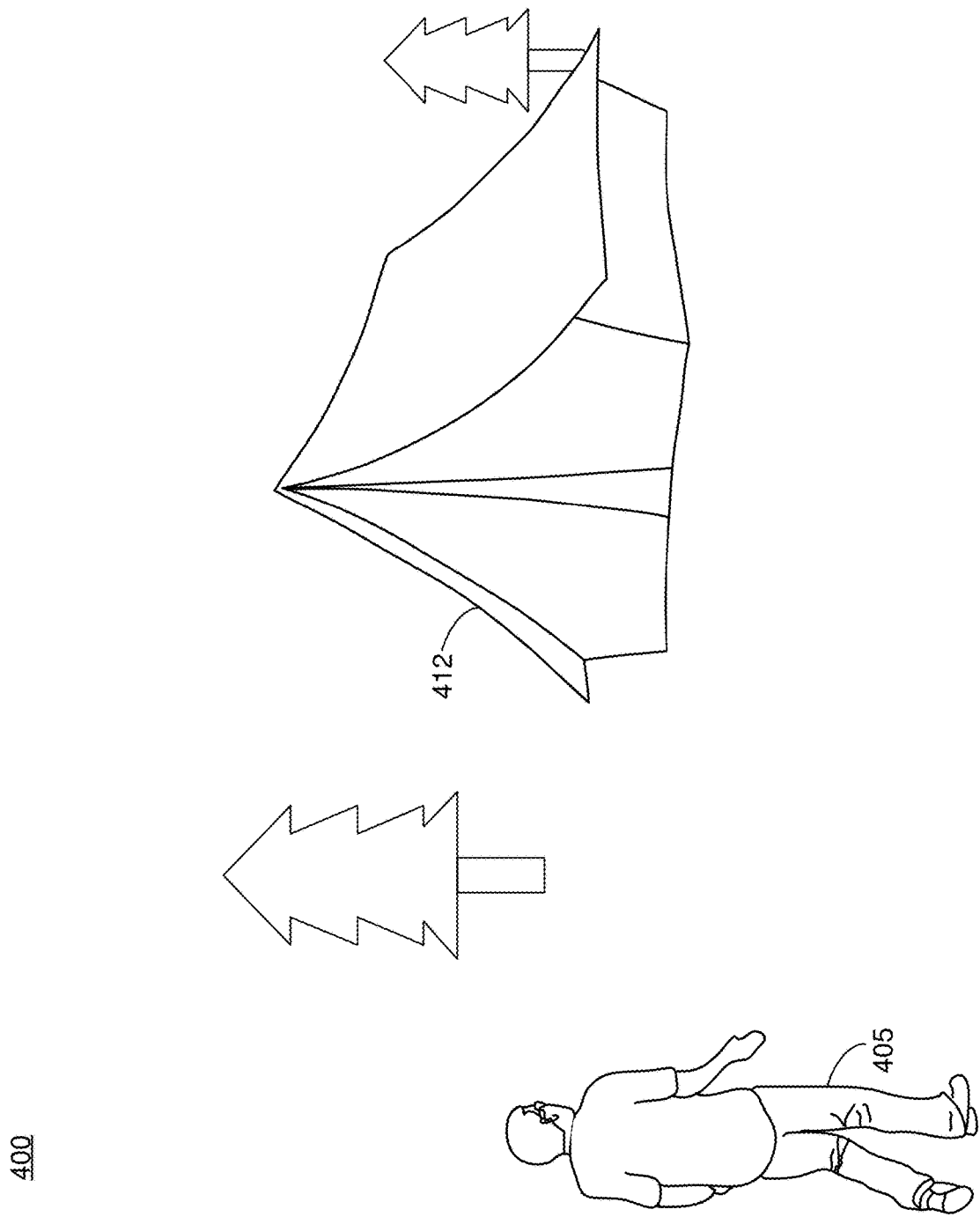
Figure 4E:
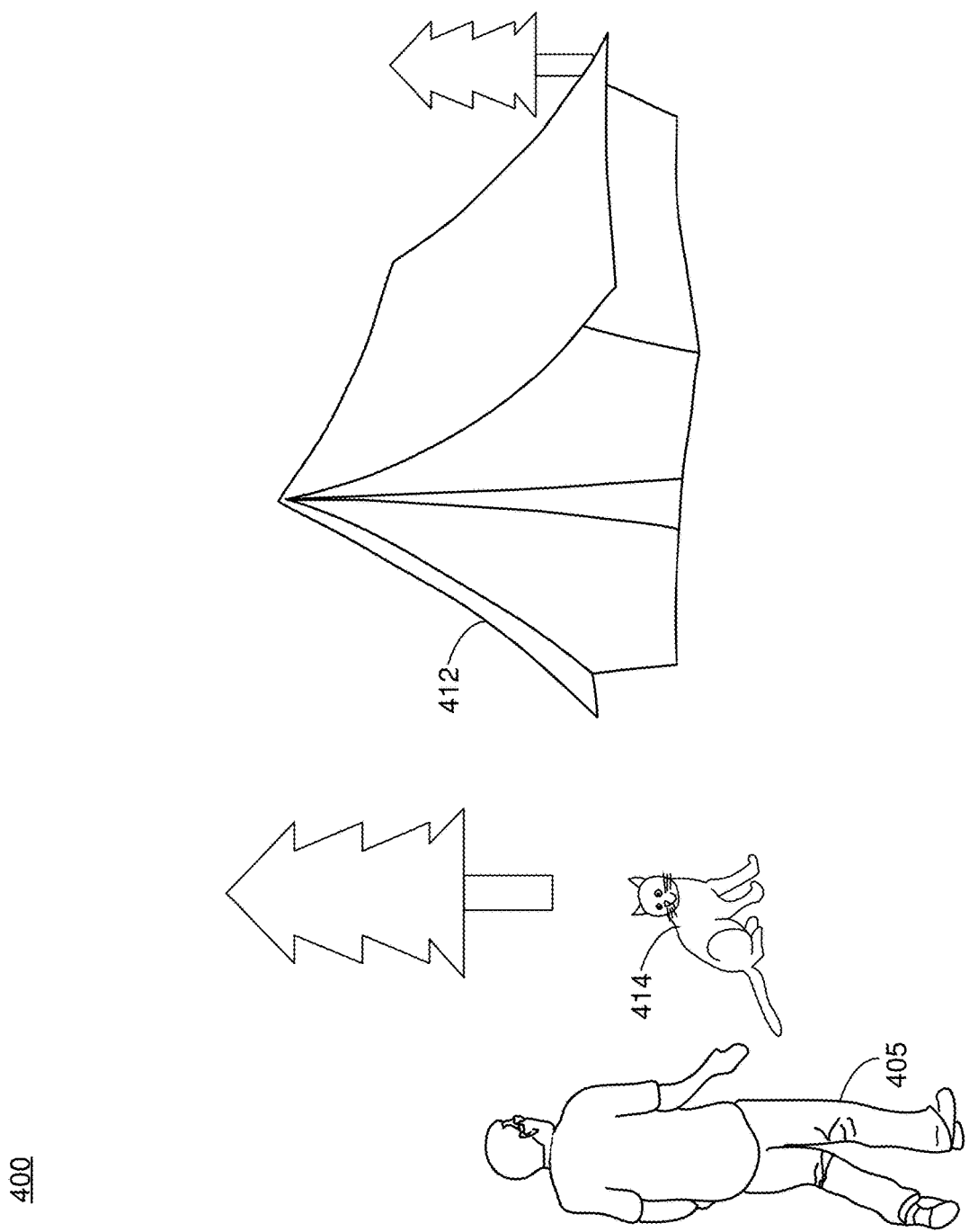
Figure 4F:
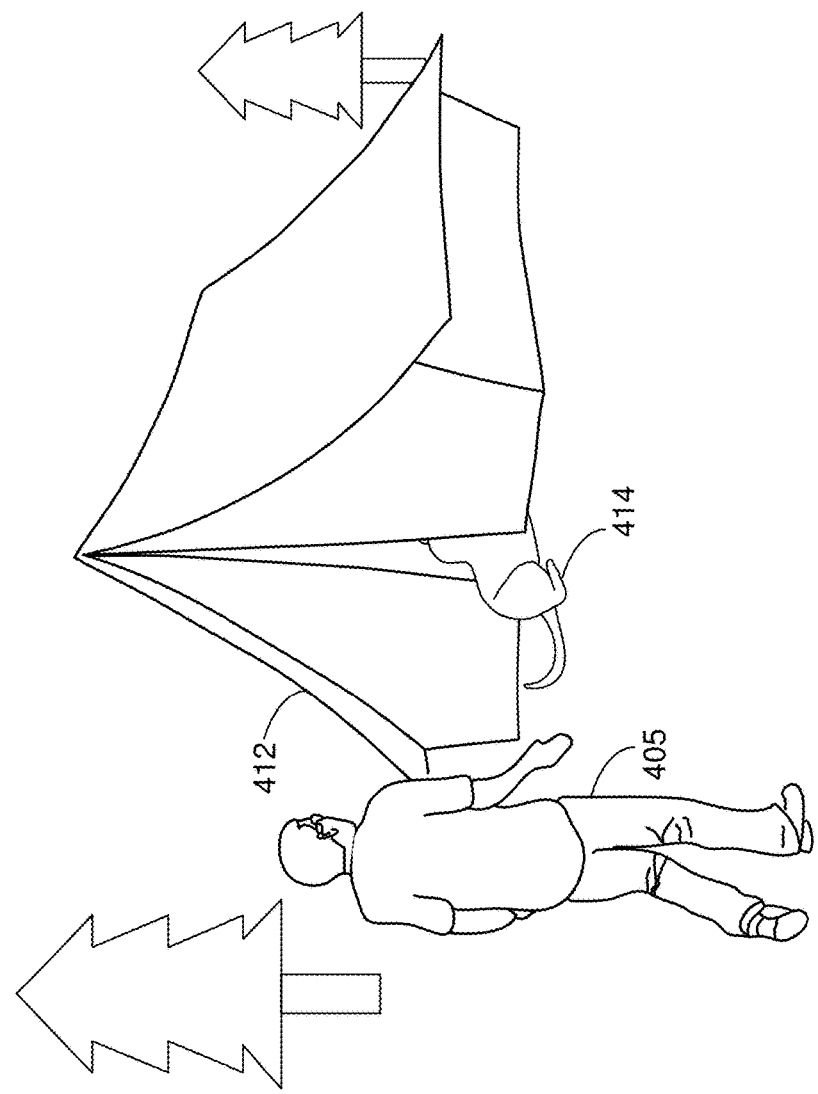
Figure 4G:
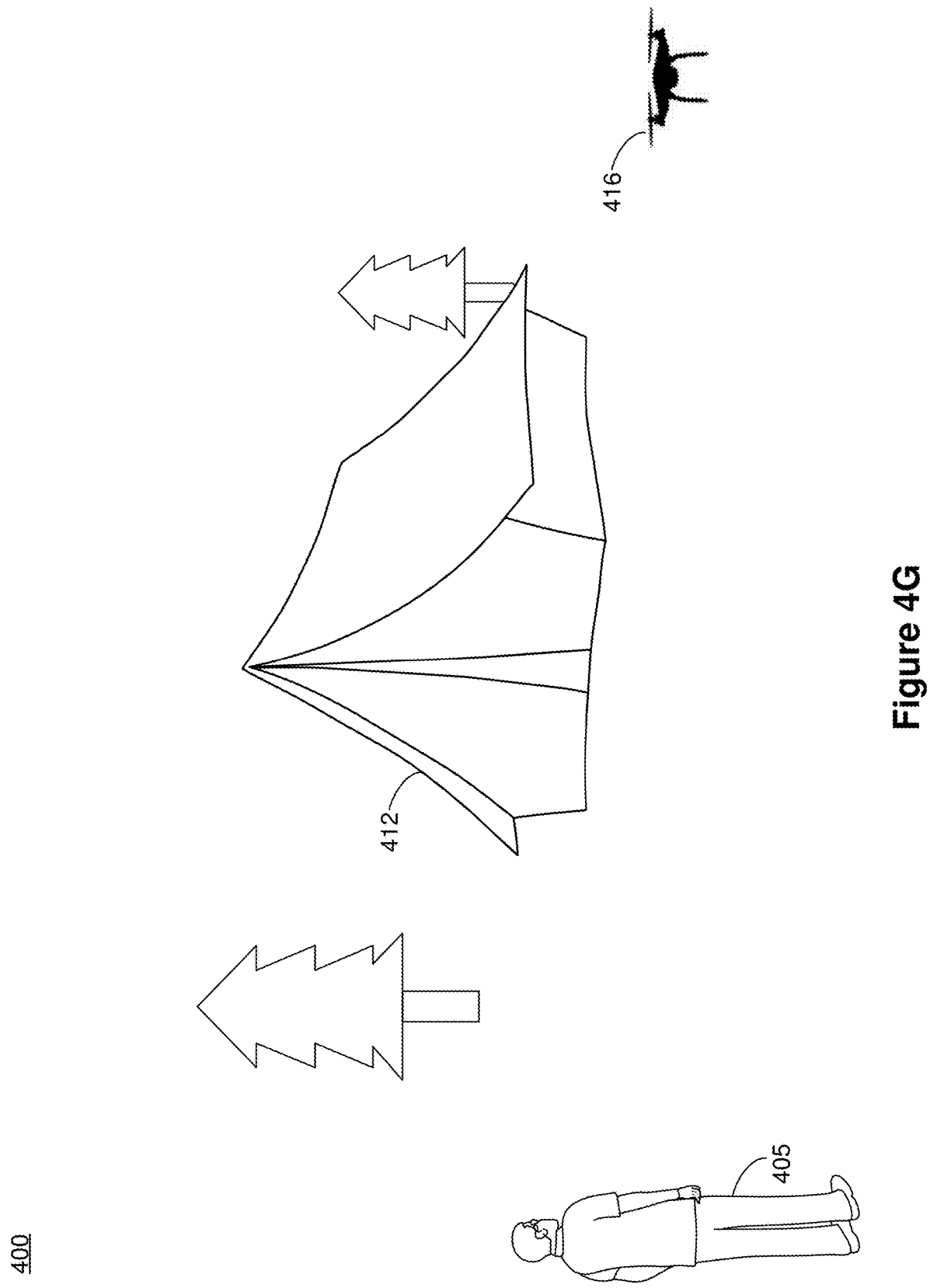
Figure 4H:
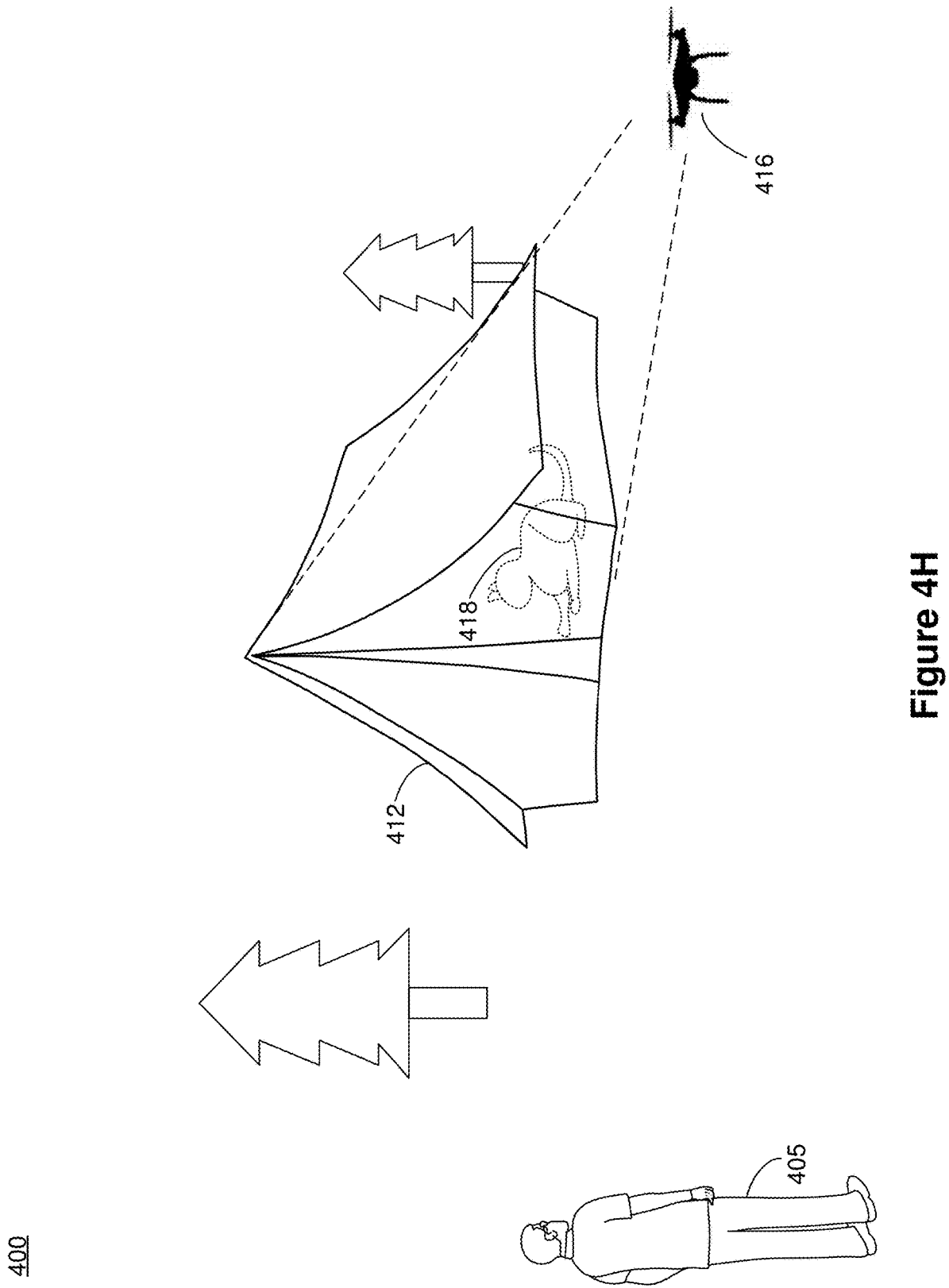
Figure 4K:
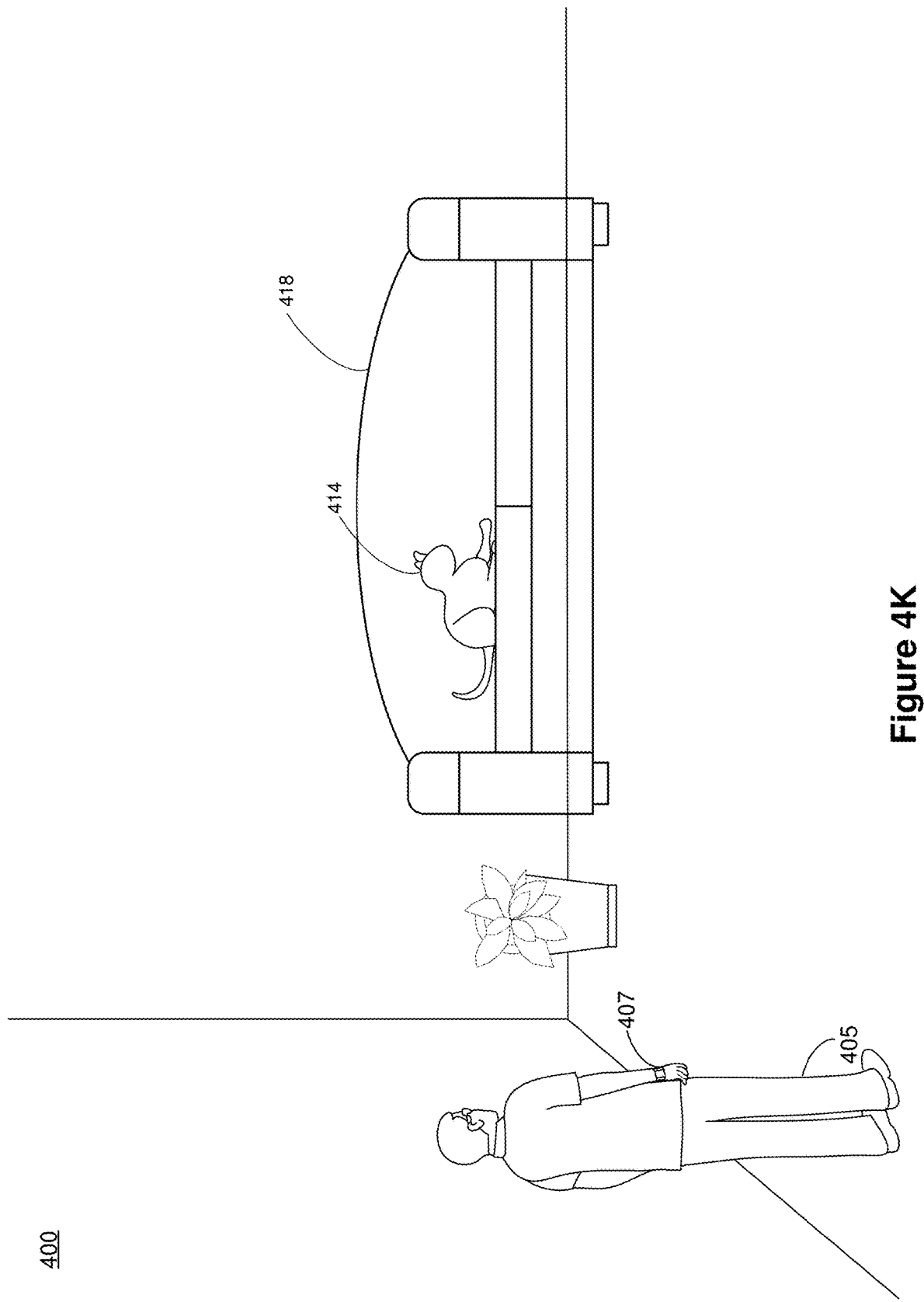
Figure 4L:
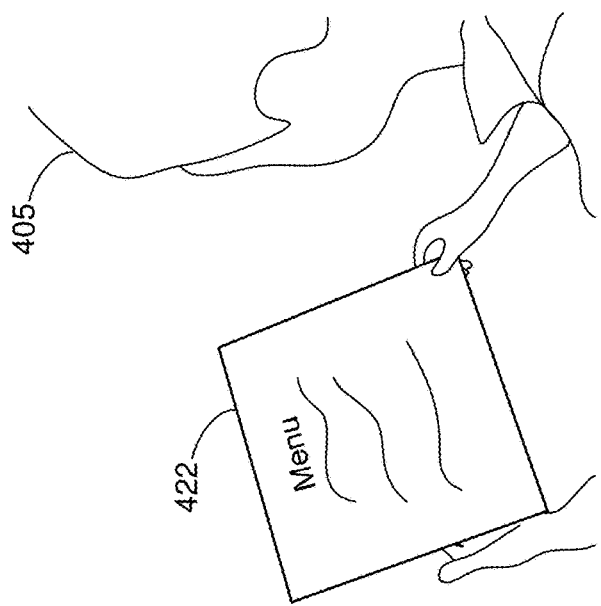
Figure 4M:
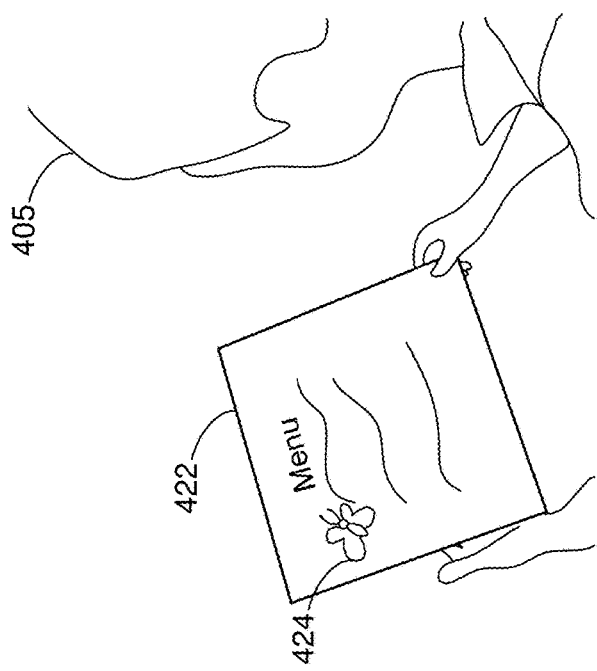
Figure 4N:
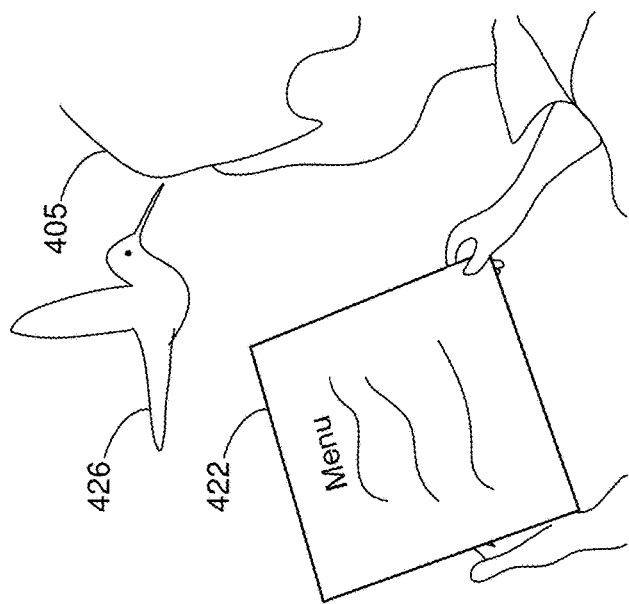
Figure 4P:
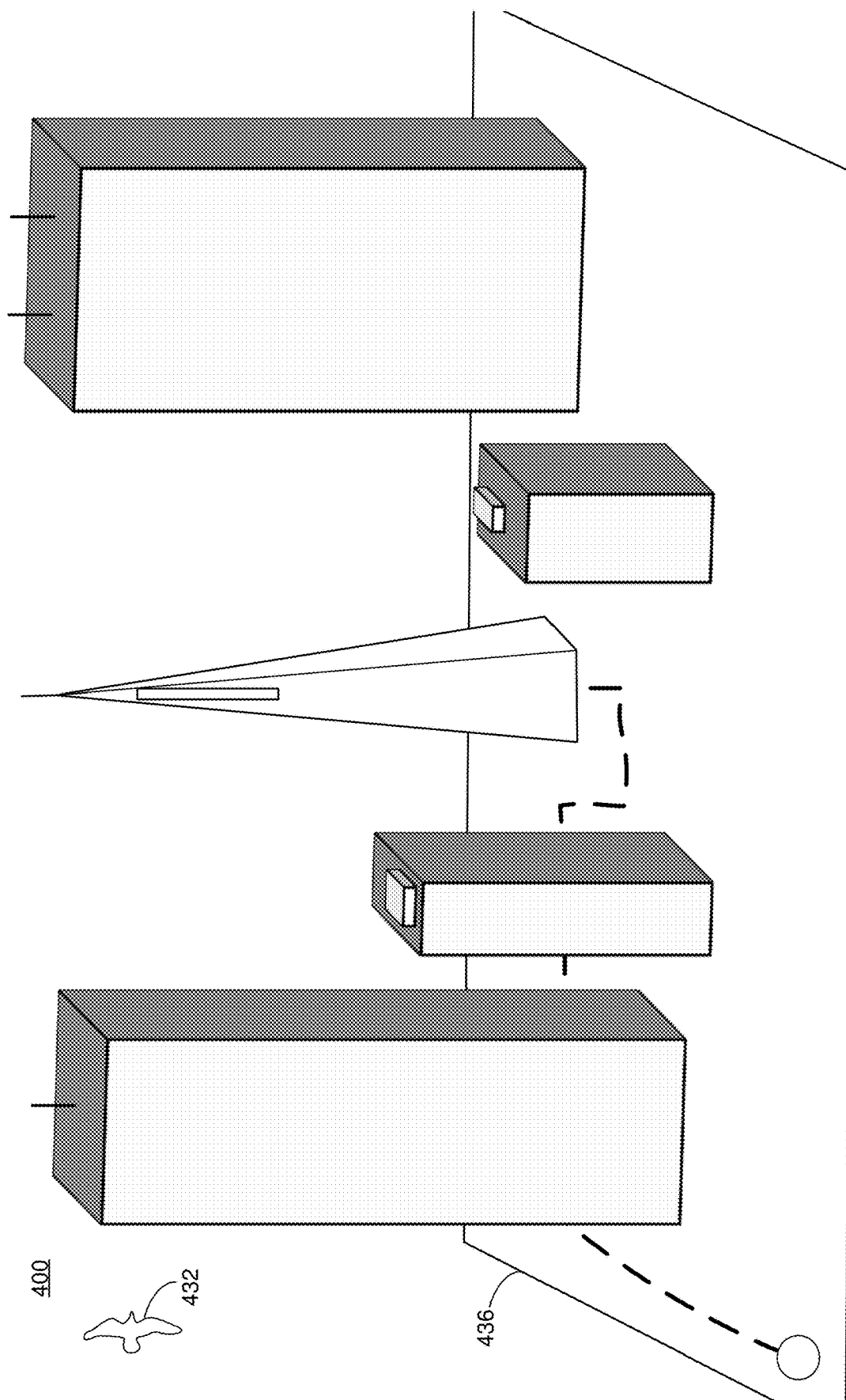
Figure 4Q:
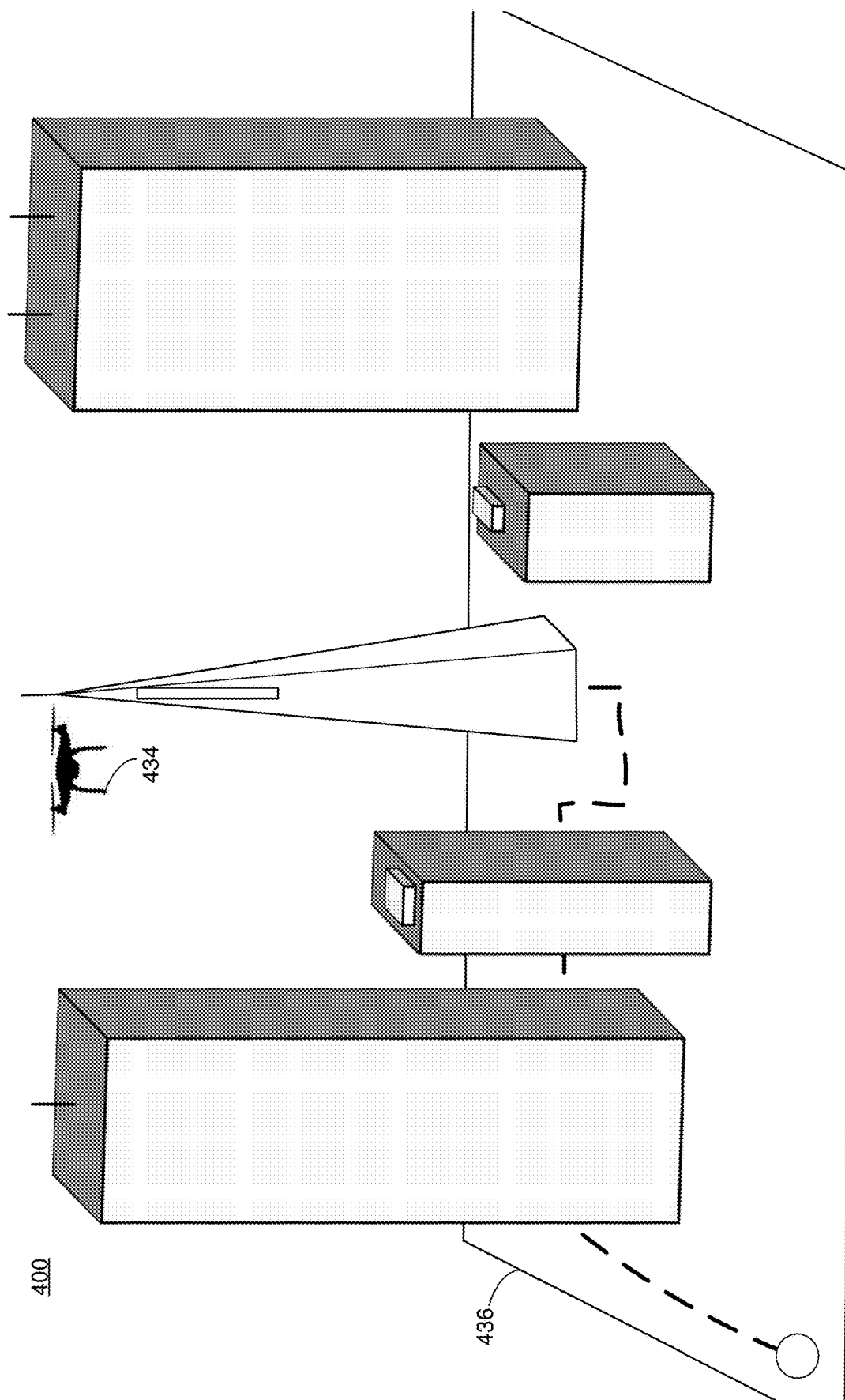
Figure 4R:
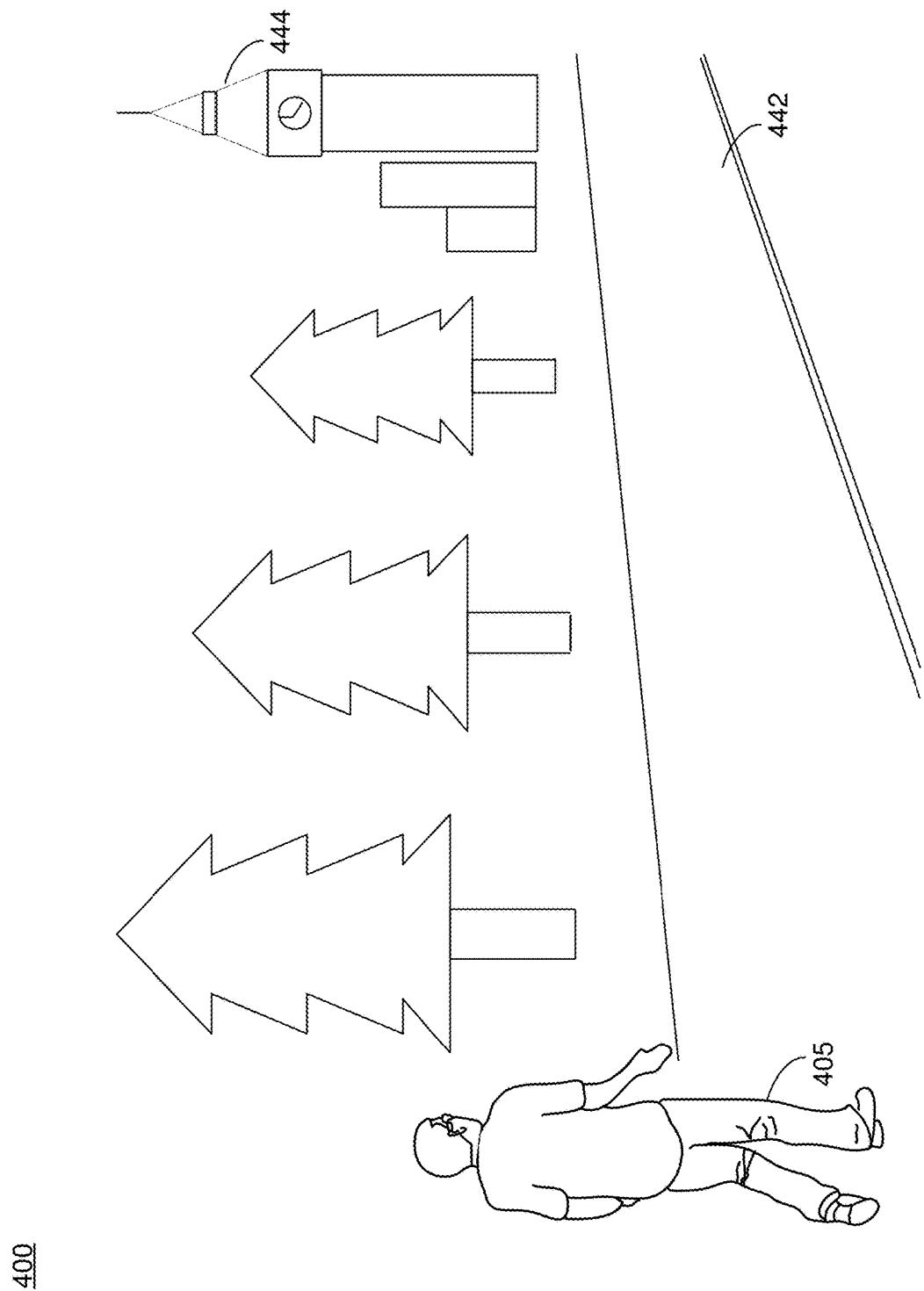
Figure 4S:
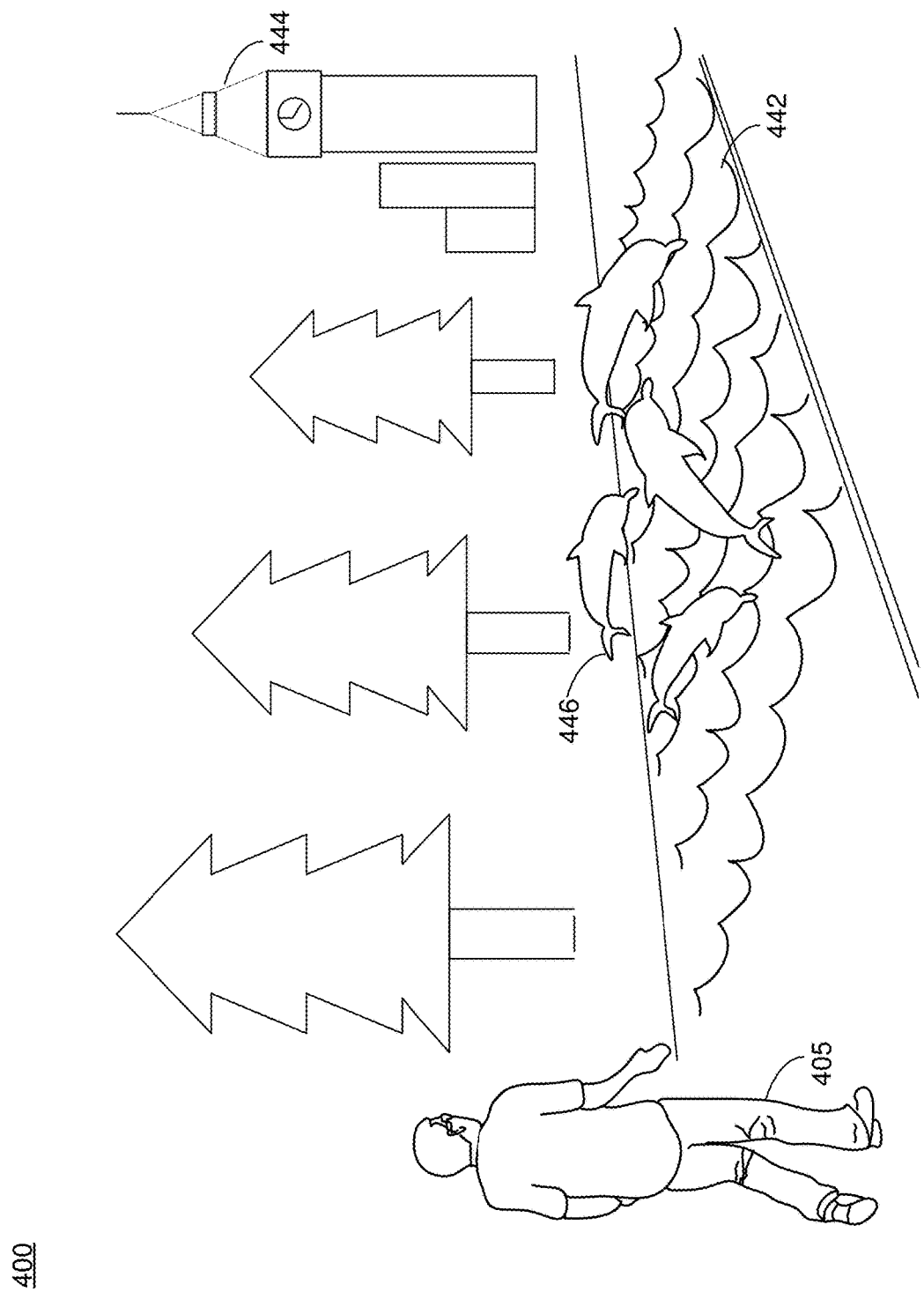
Figure 4T:
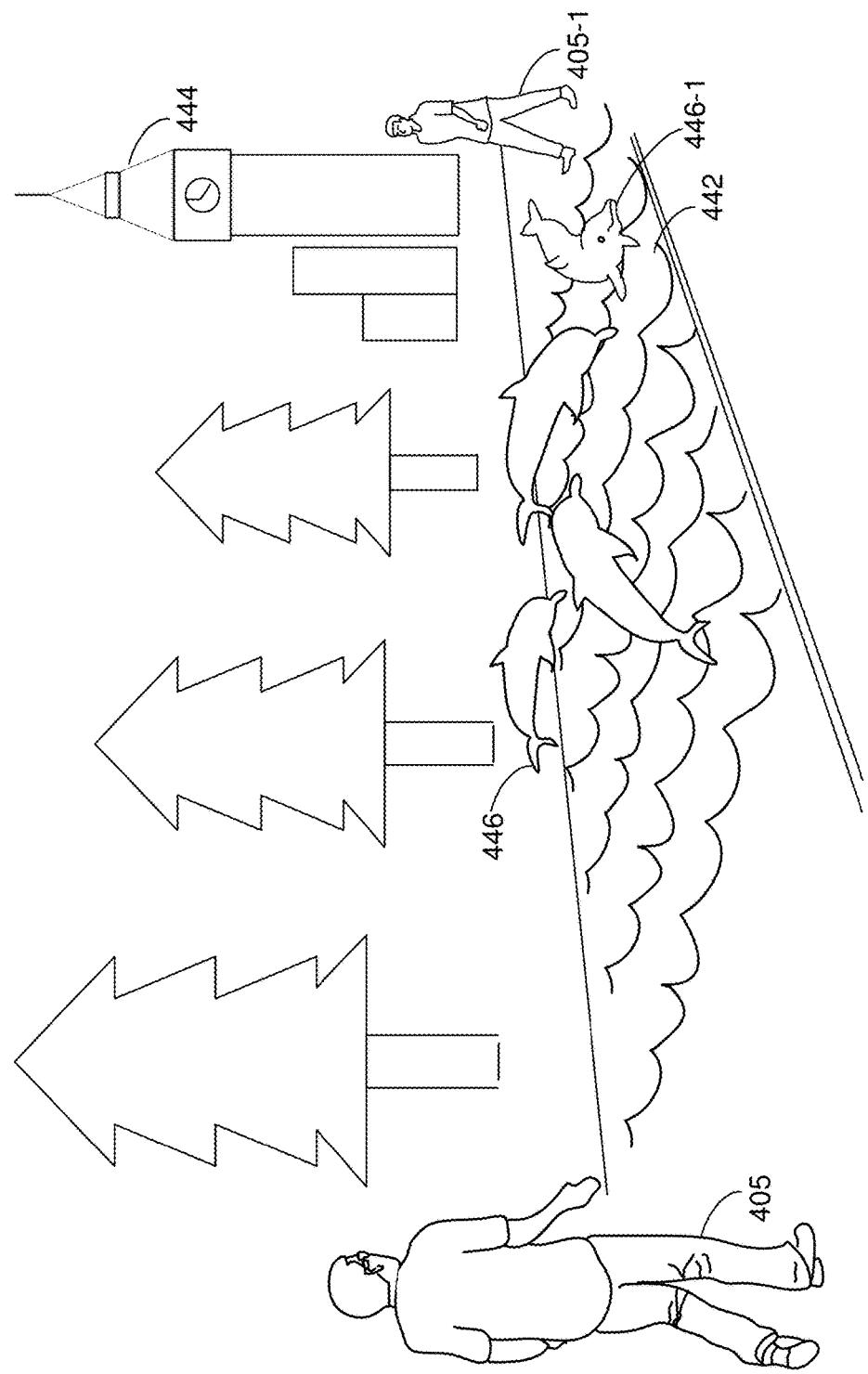

FIGS. 4A-4T illustrate an exemplary CGR environment 400 in accordance with some implementations. In some implementations, the CGR environment 400 is based on a real environment surveyed by an outward facing camera of a device. In various implementations, the outward facing camera is part of a device that is worn by the user and includes a display that displays the CGR environment 400. Thus, in various implementations, the user is physically present in the CGR environment 400. In various implementations, the outward facing camera is part of remote device (such as a drone or a robot) that transmits image data from the outward facing camera to a local device, which is worn by the user and includes a display that displays the CGR environment 400. Thus, in some such implementations, the user can be physically outside the CGR environment 400. In some implementations, as described above with reference to FIG. 1C, the image data for rendering the CGR environment 400 includes an avatar that is within a degree of similarity to the body pose of a person at a real-world scene. In FIGS. 4A-4T, the CGR environment 400 includes a user 405, which can be an avatar representing a person or a real person in a real environment. As such, the view depicted in FIGS. 4A-4T can be, for example, a view from a third-person's perspective viewing the user 405 in the CGR environment 400.

In FIG. 4A, the image data characterizes a view of a street including a restaurant 401 and a street light on a sidewalk. The user 405 looks at the store front of the restaurant 401 and also points at the restaurant sign on the restaurant 401. A contextual trigger for a contextual CGR digital assistant is identified in the pass-through image. As used herein, a contextual trigger for a contextual CGR digital assistant includes one or more objects, information (e.g., visible in the CGR environment 400 or embedded in the CGR environment 400), and/or a location associated with an available action performed by the contextual CGR digital assistant. For example, in FIG. 4A, multiple factors can trigger the contextual CGR digital assistant that can scout and return with information associated with the restaurant. Such factors can include the user 405 looking at the restaurant 401, voice commands from the user 405 to find out more information about the restaurant 401, the user 405 pointing at the restaurant 401 as shown in FIG. 4A, peeking through windows of the restaurant 401, or the absolute or relative location of the restaurant 401.

In some implementations, a computer-generated reality dog is selected as the visual representation of the contextual CGR digital assistant based at least in part on the context associated with the CGR environment 400, including a contextual meaning corresponding to a dog. For example, the contextual meaning can include animal traits or behaviors of a dog, such as dogs are commonly known to follow instructions to go scout and/or retrieve items. In another example, based on the user profile, the contextual meaning can include the user's 405 expectation of a dog being able to fetch items. Once the dog is selected as the visual representation, as shown in FIG. 4B, a highlight 402 is displayed around the restaurant sign indicating the proximate location of the contextual trigger and a computer-generated dog 404 appears in the CGR environment 400 to assist the information retrieval. The visual representation of the computer-generated dog 404 is composited into the CGR environment 400 as shown in FIG. 4C. The computer-generated dog 404 retrieves the restaurant information encapsulated in a miniature computer-generated doll house 406. In some implementations, the miniature computer-generated doll house 406 represents the restaurant 401, and an animation of the computer-generated dog 404 hauling the miniature computer-generated doll house 406 to the user 405 is displayed in the CGR environment 400. In some implementations, the user 405 can then look through windows of the miniature computer-generated doll house 406 or open the miniature computer-generated doll house 406 to look inside for the restaurant information. In some implementations, once the user 405 finishes retrieving the information, the animation of the computer-generated dog 404 along with the miniature computer-generated doll house 406 disappears. For example, e.g., the user's actions such as closing the door of the miniature computer-generated doll house 406, moving away from the miniature computer-generated doll house 406, and/or signaling the computer-generated dog 404 to leave, or interacting with the miniature computer-generated doll house 406 after a threshold amount of time, may indicate that the user 405 has finished retrieving the information brought by the computer-generated dog 404. Accordingly, the computer-generated dog 404 runs away from the user 405 and hauls away the miniature computer-generated doll house 406.

FIGS. 4D-4H illustrate displaying various visual representations of a contextual CGR digital assistant that facilitates exploration of a tent 412 in the CGR environment 400 in accordance with some implementations. In FIG. 4D, the image data characterizes a campground including the user 405 at a distance from the tent 412. As the user 405 walks closer to the tent 412, a contextual trigger for a contextual CGR digital assistant that can assist the exploration of the tent 412 is identified in the image data. The contextual trigger can include the user 405 looking at the tent 412, voice commands from the user 405 to explore the tent 412, the user 405 walking towards the tent 412, and/or the absolute or relative location of the tent 412.

In some implementations, a computer-generated cat 414 as shown in FIGS. 4E and 4F or a computer-generated robot (e.g., a computer-generated drone on the ground) 416 as shown in FIGS. 4G and 4H is selected as the visual representation of the contextual CGR digital assistant. The computer-generated cat 414 is selected, for example, based at least in part on animal traits, such as the cultural understanding and/or the user's expectation (e.g., derived from a user profile) of a cat leading a person to an interesting or mysterious place. In FIGS. 4E and 4F, the computer-generated cat 414 leads the user 405 closer to the tent 412 in order to explore the tent 412. In FIG. 4G, the computer-generated robot (or an action FIG. 416 is selected as the visual representation of the visual assistant based at least in part on the context of the user's interest in exploring the tent 412 without entering it.

For example, the user 405 stopping at a distance away from the tent 412 with the user's eyes fixed on the tent 412 indicates the user's interest of exploring the tent 412 without entering it. In another example, the travel history of the user 405 may indicate that the user 405 is new to the area and that the user 405 may not want to step into unfamiliar areas. Further, the context may include that a computer-generated robot (e.g., a computer-generated drone or an action figure etc.) 416 that is known to the user 405 of having exceptional vision can see through the tent 412 without the user entering the tent 412. As shown in FIG. 4H, the exceptional vision of the computer-generated robot 416 reveals a computer-generated cat 418 resting inside the tent 412. In some implementations, once the contextual CGR digital assistant appears in the CGR environment 400, the user 405 is empowered with the capabilities of the contextual CGR digital assistant. For example, in FIG. 4H, the user 405 can have the field of view of the computer-generated robot 416, so that the user 405 is empowered with the exceptional vision of the computer-generated robot 416 to obtain information inside the tent 412 without entering it.

In some implementations, once the user 405 finishes retrieving the information, the contextual CGR digital assistant animates (e.g., disappears or ceases to be displayed) to unclutter the scene. For example, the user's actions, such as walking away from the tent 412 after looking at it for a threshold amount of time etc., may indicate that the user has finished exploring the tent 412 and wants to explore other subjects in area. Accordingly, once the contextual CGR digital assistant serves its purpose, the visual representation of the contextual CGR digital assistant ceases to be displayed, e.g., as the computer-generated cat 414 enters the tent 412, the computer-generated cat 414 disappears, and/or the computer-generated robot 416 flies and/or walks away.

In some implementations, the visual representation of the contextual CGR digital assistant has multiple contextual meanings, such as multiple animal traits associated with an animal. For example, as explained above with reference to FIGS. 4E and 4F, the computer-generated cat 414 is selected based on the commonly known cat's traits of leading a person to an interesting or mysterious place worth exploring. Other traits of a cat include being a companion, calming, comforting, etc. As such, as shown in FIGS. 4I-4K, for example, the computer-generated cat 414 is selected as the visual representation of a companion that can curl up to the user 405.

In FIG. 4I, the computer-generated cat 414 is initially resting next to a sofa 418 in a room, while the user 405, wearing a biometric monitoring device 407, is standing across the room. Based on user profile, for example, inputs from the user 405, such as a pulse or a blood pressure reading from the biometric monitoring device 407 may indicate that the user 405 needs comforting. In some implementations, such biometric readings trigger a contextual CGR digital assistant to comfort the user 405. Based at least in part on the cat's traits of being comforting to the user 405, the computer-generated cat 414 is chosen as the visual representation of the contextual CGR digital assistant. As shown in FIG. 4J, the computer-generated cat 414 walks towards the user 405. As shown in FIG. 4K, the computer-generated cat 414 turns around and signals or invites the user 405 to the sofa 418 (e.g., via animation), so that the user 405 can rest on the sofa 418 and pet the computer-generated cat 414 for comfort.

FIGS. 4L-4N illustrate various visual representations of a contextual CGR digital assistant that identifies small details and draws attention to the details in the CGR environment 400 in accordance with some implementations. In FIG. 4L, the image data characterizes the user 405 holding and reading a menu 422. Multiple factors can trigger the activation of a contextual CGR digital assistant that can identify small details, such as an item on the menu 422. Such factors can include but not limited to, inputs from the user (e.g., the user 405 looking at the menu 422 within close distance) and/or the position of the menu 422 relative to the user 405. In some implementations, the menu item on the menu 422 can be a daily special based on the context of the restaurant, a local's favorite item based on the context of local reviews, and/or a preference of the user based on the user profile of the user 405. The contextual CGR digital assistant thus can appear in the CGR environment 400 automatically, and its appearance subtly draws the user's attention to the item on the menu 422 that may be of interest to the user 405.

In some implementations, a visual representation of contextual CGR digital assistant that can fit in a small space is selected based on the context of the small space (e.g., short distance between the menu 422 and the user 405 or a page of the menu 422) and/or contextual meanings of the visual representation of the contextual CGR digital assistant. As shown in FIG. 4M, a computer-generated butterfly 424 is selected as the visual representation of the contextual CGR digital assistant based at least in part on its traits of being small and colorful attracting attention and its capability of landing in a small space. The computer-generated butterfly 424 lands next to a menu item on the menu 422 to draw the user's attention to a menu item in accordance with some implementations.

As shown in FIG. 4N, a computer-generated hummingbird 426 is selected as the visual representation of the contextual CGR digital assistant. The computer-generated hummingbird 426 can use its needle-like beak to pinpoint a specific item on the menu 422 or fly closer to the user 405 to whisper the menu item to the user 405. In some implementations, the audio output, such as the whispering, is provided using a plurality of speakers, where the audio output spatially corresponds to a location associated with the computer-generated hummingbird 426 in the field of view. The computer-generated hummingbird 426 is selected, for example, based at least in part on its traits of being small, its pointer-like beak, and humming while flying. In some implementations, once the user 405 finishes retrieving the information, e.g., as indicated by the user ordering the item on the menu 422 proximate the computer-generated butterfly 424 or the computer-generated hummingbird 426 or putting away the menu 422, the computer-generated butterfly 424 or the computer-generated hummingbird 426 animates (e.g., flies away) to unclutter the scene.

FIGS. 4O-4Q illustrate various visual representations of a contextual CGR digital assistant to provide different perspectives (e.g., plan view, bird's-eye view, 3-D view, or aerial-view) on an area in the CGR environment 400 in accordance with some implementations. In FIG. 4O, the image data characterizes the user 405 standing on the ground and looking at buildings ahead. In some implementations, the body poses of the user 405, such as looking up to the sky or looking at a landmark far away, indicate that the user 405 is interested in finding out more about the surrounding or a path leading to the landmark. In response to the body poses information in the image data, a contextual trigger for a contextual CGR digital assistant can assist the user 405 to explore the user's surroundings.

In some implementations, a visual representation of the contextual CGR digital assistant is selected based on context including at least one contextual meaning of the visual representation. As shown in FIG. 4P, a computer-generated falcon or a computer-generated eagle 432 with exceptional vision that is flying high is selected as the visual representation of the contextual CGR digital assistant. As shown in FIG. 4Q, a computer-generated drone (or a CGR hot air balloon) 434 flying in the air equipped with computerized vision is selected as the visual representation of the contextual CGR digital assistant. Further, the perspectives in the CGR environment 400 has changed from the ground-view in FIG. 4O to a plan-view 436 as shown in FIGS. 4P and 4Q with a 3D rendering of buildings. In some implementations, additional computer-generated reality content associated with the new perspective, such as a navigation path from a location of the user 405 to a landmark, is provided to the user. The changes in the perspectives are consistent with the user's 405 perspective, as the user 405 is empowered with the exceptional vision of the contextual CGR digital assistant (e.g., the computer-generated falcon or the computer-generated eagle 432 or the computer-generated drone 434). Further, the changes in the perspectives and the additional computer-generated reality content can assist the user 405 to explore the surroundings. In some implementations, once the user 405 finishes retrieving the information, e.g., as indicated by looking down or elsewhere, or as indicated by a handwaving gesture or a voice command from the user 405, the computer-generated falcon 432 or the computer-generated drone 434 flies away or flies to a corner of the CGR scene. In some implementations, as the computer-generated falcon 432 or the computer-generated drone 434 flies away, the computer-generated reality content (e.g., the highlighted path from to the landmark) also fades away.

FIGS. 4R-4T illustrate various visual representations of a contextual CGR digital assistant providing navigation in the CGR environment 400 in accordance with some implementations. In FIG. 4R, the image data characterizes the user 405 walking along a path 442 towards a train station 444. Atop the train station 444 is a clock. The time shown on the clock indicates that a train that the user 405 is scheduled to ride is arriving soon. In some implementations, a contextual trigger for a contextual CGR digital assistant that can provide navigation and guidance along the path 442 to the training station 444 is identified in the pass-through image. The contextual trigger includes, for example, the time, the user profile, and the user's body pose, and/or the path 442 that is leading to the train station 444 etc.

Dolphins are often regarded as one of the Earth's most intelligent animals, performing actions such as navigation using the magnetic field of the earth. Further, dolphins are known to be able to interact with people as they are highly sociable with people. As such, based on these traits of dolphins, as shown in FIG. 4S, dolphins 446 are selected as the visual representation of the contextual CGR digital assistant to provide navigation and lead the user 405 to the train station 444. In FIG. 4S, water is displayed as an overlay on the path 442 with the dolphins 446 swimming in the water.

In some implementations, depending on context including the calendar events associated with the user 405, such as train schedule and the current time, the animation of the dolphins 446 adapts to the context. For example, if the train schedule and the current time and/or location of the user 405 indicate that the user 405 is about to be late to catch the train, the computer-generated dolphins 446 swim faster to guide the user 405 towards the train station 444 in order to catch the train. On the other hand, if the context indicates that the user has plenty of time to catch the train, the computer-generated dolphins 446 may swim relatively slower towards the train station 444. In some implementations, the visual representation of the contextual CGR digital assistant is animated such that the visual representation is interactive. For example, as shown in FIG. 4T, when another user 405-1 appears in the CGR environment 400, a computer-generated dolphin 446-1 that swims the closest to the user 405-1 swims around the other user 405-1. As depicted herein, the user 405-1 may be another avatar in the CGR scene, or another real-world person in the field of view of the user 405. As such, following the lead of the computer-generated dolphins 446, the user 405 can walk along to the path 442 without running into obstacles (e.g., the other user 405-1 or a light pole etc.).

In some implementations, the contextual CGR digital assistant along with computer-generated reality content ceases to be displayed once the contextual CGR digital assistant serves its purpose. For example, when the user 405 is within a threshold distance from the train station 444, the user 405 may no longer need the computer-generated dolphins 446 to lead the way and/or to gauge his pace in order to catch the train. Accordingly, the computer-generated dolphins 446 along with the water displayed as an overlay on the path gradually cease to be displayed, e.g., as if the computer-generated dolphins 446 swim away and the water recedes.

Figure 5:
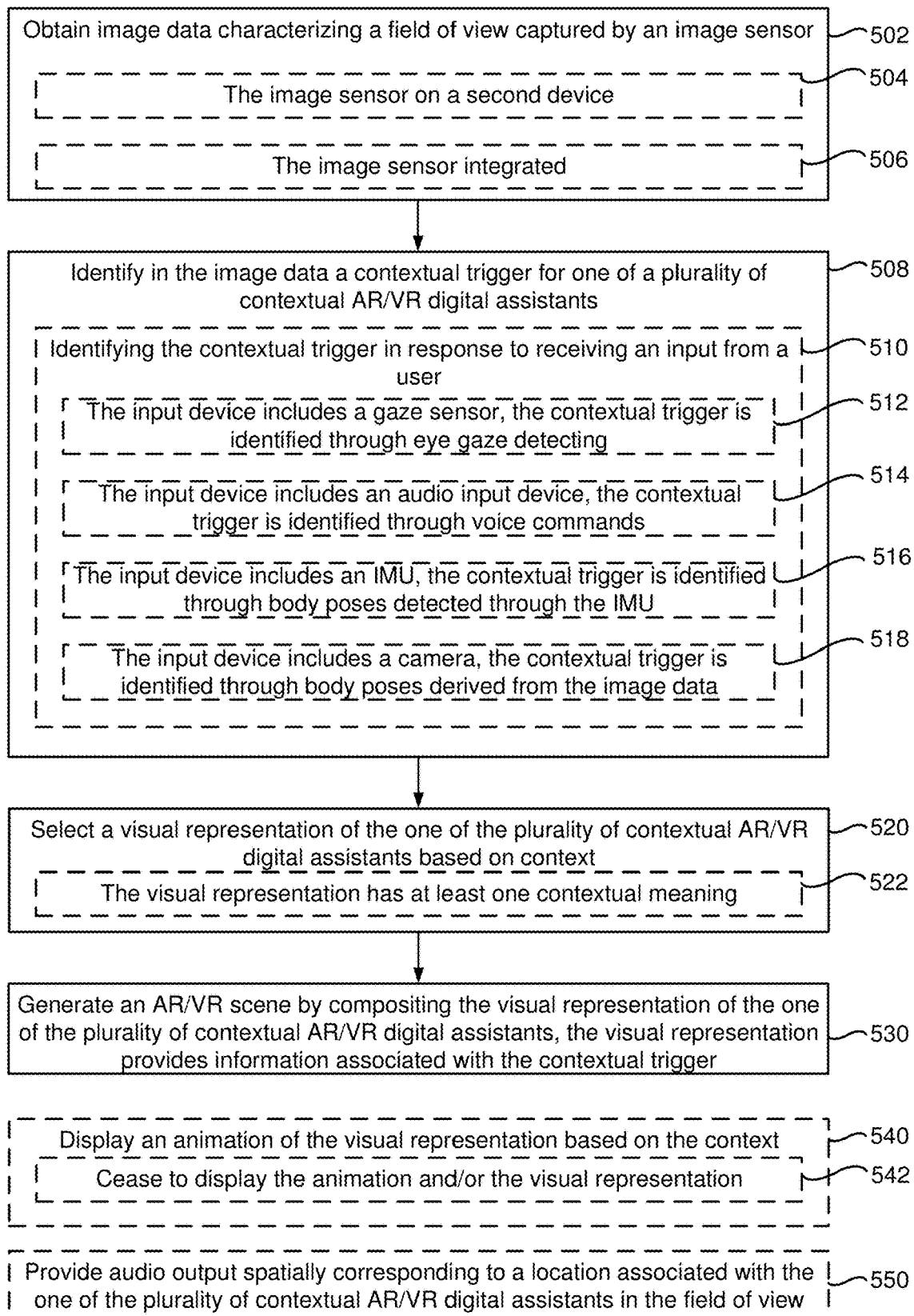
FIG. 5 is a flowchart representation of a method of providing contextual CGR digital assistant in accordance with some implementations.

FIG. 5 is a flowchart representation of a method 500 of providing contextual CGR digital assistant in accordance with some implementations. In various implementations, the method 500 is performed by a device with one or more processors, non-transitory memory, and one or more displays. In some implementations, the device includes a head-mounted device, a mobile phone, a tablet, and/or a drone. In some implementations, the method 500 is performed by processing logic, including hardware, firmware, software, or a combination thereof. In some implementations, the method 500 is performed by a processor and/or a controller (e.g., the controller 102 in FIG. 1) executing instructions (e.g., code) stored in a non-transitory computer-readable medium (e.g., a memory). Briefly, in some circumstances, the method 500 includes: obtaining image data characterizing a field of view captured by an image sensor; identifying in the image data a contextual trigger for one of a plurality of contextual CGR digital assistants; in response to identifying the contextual trigger, selecting a visual representation of the one of the plurality of contextual CGR digital assistants; and generating a CGR scene by compositing the visual representation of the one of the plurality of contextual CGR digital assistants, wherein the visual representation provides information associated with the contextual trigger.

The method 500 begins, in block 502, with the device, obtaining image data characterizing a field of view captured by an image sensor. In some implementations, as represented by block 504, obtaining the image data (e.g., passthrough image data) characterizing the field of view captured by the image sensor includes receiving the image data characterizing the field of view captured by the image sensor on a second device, distinct from the device. For example, while the user wears a head-mounted device, the image sensor is located on a drone or a hot air balloon in the air in order to provide an aerial view of the environment. In some implementations, as represented by block 506, obtaining the image data characterizing a field of view captured by the image sensor includes obtaining the image data characterizing the field of view captured by the image sensor integrated into the device. For example, one or more outward facing cameras integrated with the head-mounted device can capture a view of a street.

The method 500 continues, in block 508, with the device identifying in the image data a contextual trigger for one of a plurality of contextual CGR digital assistants. For example, in FIGS. 4A-4C, the device identifies in the image data that the user 405 needs assistance with accessing information about the restaurant 401. Thus, a contextual trigger for a contextual CGR digital assistant is identified for a contextual CGR digital assistant (e.g., the computer-generated dog 404) that can scout and bring information to the user 405. In FIGS. 4D-4H, the device identifies in the image data that the user needs assistance to explore the tent 412. Thus, a contextual trigger for a contextual CGR digital assistant is identified for a contextual CGR digital assistant (e.g., the computer-generated cat 414) that can accomplish the action of exploring the tent 412. In another example, in FIGS. 4L-4N, the device identifies in the image data that the user 405 needs assistance to highlight details on the menu 422. Thus, a contextual trigger for a contextual CGR digital assistant is identified for a contextual CGR digital assistant (e.g., the computer-generated butterfly 424 or the computer-generated hummingbird 426) that can fit in a small space and can draw the user's attention to small details on the menu 422. In yet another example, in FIGS. 4P and 4Q, the device identifies in the image data that the user wishes to gain an aerial view of the environment. As such, a contextual trigger for a contextual CGR digital assistant is identified for a contextual CGR digital assistant (e.g., the computer-generated eagle 432 or the computer-generated drone 434) that can empower the user with exceptional vision. In still another example, in FIGS. 4R-4T, the device identifies in the image data (e.g., the time shown on the clock of the train station building 444) that the user 405 needs assistance with navigating through the path 442 leading to the train station 444. Accordingly, a contextual trigger for a contextual CGR digital assistant is identified for a contextual CGR digital assistant (e.g., the computer-generated dolphins 446) that can provide guidance and navigation to the train station 444.

Still referring to FIG. 5, as represented by block 510, in some implementations, the contextual trigger for the one of the plurality of contextual CGR digital assistants is identified in response to receiving an input from a user through an input device (e.g., the I/O devices & sensors 306 in FIG. 3 and/or the I/O devices 206 in FIG. 2) connectable or integrated into the device. In some implementations, the input is included in the image data. In some implementations, the input device includes, but not limited to, an eye tracker or a gaze sensor for eye gaze tracking, an audio input device (e.g., a microphone) for voice commands, an IMU for poses and/or gestures, one or more cameras with image sensors for capturing images and deriving poses, a biometric monitoring device (e.g., the device 407 in FIGS. 4I-4K), a touch-sensitive surface for detecting gestures, and/or GPS for location tracking.

For example, as represented by block 512, when the input device includes an eye tracker or a gaze sensor to detect and track an eye gaze of the user, identifying in the image data the contextual trigger for the one of the plurality of contextual CGR digital assistants includes: (a) detecting the eye gaze of the user proximate to an object in the field of view; and (b) activating the contextual trigger associated with the object in the image data. In one example, a contextual trigger of providing an aerial view is associated with a CGR hot air balloon floating at a corner of the CGR scene. When the user looks at the sky where the CGR hot air balloon floats, a contextual trigger for a contextual CGR digital assistant is identified from the gaze information. In another example, as shown in FIGS. 4B and 4C, upon detecting a gaze on the restaurant 401, a contextual trigger for a contextual CGR digital assistant is identified, where the contextual CGR digital assistant is expected to bring restaurant information to the user 405. In yet another example, as shown in FIGS. 4M and 4N, upon detecting a gaze on the menu 422, a contextual trigger for a contextual CGR digital assistant is identified that can highlight small details on the menu 422.

In some implementations, as represented by block 514, when the input device includes an audio input device (e.g., a microphone) to obtain a voice command from the user, identifying in the image data the contextual trigger for the one of the plurality of contextual CGR digital assistants includes activating the contextual trigger according to the voice command. For example, according to a voice command of "Find out more information about the restaurant", a contextual trigger for a contextual CGR digital assistant that can find out more information about the restaurant is identified. In another example, according to a voice command of "What's good on the menu?", a contextual trigger for a contextual CGR digital assistant that can draw the user's attention to chef's special on the menu is identified.

In some implementations as represented by block 516, when the input device includes an inertial measurement unit (IMU) to obtain body poses of the user, identifying in the image data the contextual trigger for the one of the plurality of contextual CGR digital assistants includes deriving from the body poses positions of body portions (e.g., head, neck, arm, leg, hand) of the user. In some implementations, as represented by block 518, the body poses are derived from images obtained by image sensors of one or more cameras. For example, an HMD worn by the user can include front-facing cameras, side-facing cameras, downward-facing cameras, etc. to obtain image data. Using different cameras to capture different parts of the user and correlating different images captured by these cameras, positions of different body portions can be identified. In some implementations, the positions of body portions can indicate an interest in a subject in the image data. Accordingly, a contextual trigger for a contextual CGR digital assistant associated with the subject in the image data can be activated. For example, as shown in FIG. 4A, the user 405 is pointing at the restaurant 401. The body pose of pointing indicates an interest of finding out more information about the restaurant 401. As such, as shown in FIGS. 4B and 4C, a contextual trigger for a contextual CGR digital assistant is activated that can fetch and bring restaurant information to the user 405. In another example, as shown in FIG. 4P, when the user looks up to the sky, the body pose indicates the user's desire to gain an aerial view. As such, a contextual trigger for a contextual CGR digital assistant is activated that can provide a different perspective of the landscape to the user. In yet another example, when the user looks down to check the time on his wrist watch, the body pose may indicate that the user needs assistance to track his pace to a train station. Accordingly, a contextual trigger for a contextual CGR digital assistant is identified that can assist with navigation and guidance to the train station, as shown in FIGS. 4S and 4T.

Referring back to FIG. 5, the method 500 continues, in block 520, with the device selecting a visual representation of the one of the plurality of contextual CGR digital assistants, where the visual representation is selected based on context and in response to identifying the contextual trigger. In some implementations, the context includes at least one of a profile of the user, a calendar event, a location of the user, and/or a usage history. For example, based on the user profile, the user is interested in exploring the surroundings, a computer-generated falcon (FIG. 4P), a computer-generated drone (FIG. 4Q), a CGR hot air balloon, or the CGR big dipper constellation in the sky is selected as the visual representation for a contextual CGR digital assistant that provide view of the area from above the ground.

In some implementations, the visual representation of the one of the plurality of contextual CGR digital assistants has at least one contextual meaning. In other words, the contextual meaning represents what people expect a CGR representation to do and/or a cultural understanding of what is associated with the CGR representation. Some contextual meanings include, for example, the big dipper constellation in the night sky providing navigation or direction, the dog being a fast runner and retriever, the cat often being aloof and leading to somewhere mysterious, inquisitive or calm and comforting for companionship, the falcon's capability of flying high, the dolphin's ability to navigate and swim around obstacles, the hummingbird/butterfly being small in size, the parrot that speaks, the hot air balloon being up in the sky with views of subjects on the ground, and/or the robot's super power to places difficult for human and the ability retrieve information beyond human brain capacity.

For example, as shown in FIGS. 4E and 4F, based on the user's expectation of a cat to lead the user to an interesting place worth exploring, the computer-generated cat 414 is selected as the visual representation for the contextual CGR digital assistant. In another example, as shown in FIGS. 4G and 4H, based on the user's hesitation to enter a tent on a camp ground in order to discover what is inside, a computer-generated robot 416 with exceptional vision is selected as the visual representation for the contextual CGR digital assistant.

Referring back to FIG. 5, the method 500 continues, in block 530, with the device generating the CGR scene by compositing the visual representation of the one of the plurality of contextual CGR digital assistants, where the visual representation provides information associated with the contextual trigger. In some implementations, as represented by block 540, the method 500 further includes displaying on the one or more displays animation of the visual representation of the one of the plurality of contextual CGR digital assistants providing the information to a user. In some implementations, the animation of the visual representation is adjusted according to the context. For example, the swim speed of the computer-generated dolphins changes in accordance with the current time and the train schedule. In accordance with a determination that the user is short on time, the computer-generated dolphins may swim faster in order to guide the user to the train station faster. Further, as shown in FIG. 4T, based on the context of another user 405-1 also walking along the path, the computer-generated dolphin 446-1 within a threshold distance from the user 405-1 swims around the user 405-1, so that the user 405 following the computer-generated dolphins 446 can avoid running into obstacles.

In some implementations, as represented by block 542, the method 500 further includes determining that the user has received the information, and ceasing to display the animation of the visual representation in the CGR scene in accordance with some implementations. For example, in FIGS. 4B and 4C, an animation of the computer-generated dog 404 retrieving the miniature computer-generated doll house 406 is composited into the CGR scene 400 and displayed to the user 405 as an overlay. In some implementations, the user 405 can interact with the visual representation, such as opening or looking through the windows of the miniature computer-generated doll house 406 and finding out more about the restaurant 401.

In some implementations, once the user finishes looking at the restaurant information, in response to detecting a gesture signaling the end of viewing the information, or after a threshold amount of time displaying the animation of the visual representation, the visual representation of the contextual CGR digital assistant disappears from the CGR environment in order to unclutter the scene. For example, an animation of the computer-generated falcon 432 or the computer-generated drone 434 flying in the sky is displayed along with the changing perspective, e.g., a plan-view or aerial view of an area with the navigation path to a destination, as shown in FIGS. 4P and 4Q. Once the user 405 finishes viewing the information, e.g., upon detecting a hand waving gesture to signal the computer-generated falcon 432 or the computer-generated drone 434 to fly away, the computer-generated falcon 432 flies away and fades out in the CGR scene or the computer-generated drone 434 flies to a corner. Accordingly, the ground perspectives are restored. In yet another example, the computer-generated dolphins 446 swimming in the water are displayed as an overlay on the path 442, as shown in FIGS. 4S and 4T. In accordance with a determination that the user has entered the train station 444 or within a threshold distance from the train station 444, the computer-generated dolphins 446 swim away and the water ceases to be displayed.

In some implementations, the device includes one or more output devices, such as one or more speakers. As represented by block 550, the method 500 further includes providing audio output using a plurality of speakers, where the audio output spatially corresponds to a location associated with the one of the plurality of contextual CGR digital assistants in the field of view. For example, in FIGS. 4B and 4C, a computer-generated dog barking sound can be played to signal the presence of the dog CGR 404 and draw the user's attention to the computer-generated dog 404 proximate to the miniature computer-generated doll house 406. In another example, in FIGS. 4S and 4T, a splashing sound can be played to signal the presence of the computer-generated dolphins 446 and guide the user 405 along the path 442. In some implementations, the information provided by the CGR digital assistant can be read to the user to draw the user's attention to a location. For example, the computer-generated hummingbird 426 as shown in FIG. 4N whispers a favorite menu item and the whispering draws the user's attention to the item on the menu 422.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including one or more processors, non-transitory memory, and one or more displays:
obtaining image data characterizing a field of view captured using an image sensor;
identifying in the image data a contextual trigger for one of a plurality of contextual computer-generated reality (CGR) digital assistants, wherein the contextual trigger includes one or more objects associated with information in the image data;
in response to identifying the contextual trigger, selecting a first visual representation of the one of the plurality of contextual CGR digital assistants for a CGR scene based on context, a first contextual meaning of the first visual representation of the one of the plurality of contextual CGR digital assistants, and a profile of a user, wherein according to the profile, the first visual representation has the first contextual meaning in the context for providing the information to the user in the CGR scene;
presenting the CGR scene by displaying the first visual representation of the one of the plurality of contextual CGR digital assistants in the CGR scene to provide the information associated with the contextual trigger including the one or more objects to the user according to the context in the CGR scene;
selecting a second visual representation of the one of the plurality of contextual CGR digital assistants for the CGR scene, different from the first visual representation, wherein the second visual representation is selected based on the context, a second contextual meaning of the second visual representation in the context, and the profile; and
displaying the second visual representation in the CGR scene to provide the information.

2. The method of claim 1, wherein obtaining the image data characterizing the field of view captured by the image sensor includes receiving the image data characterizing the field of view captured using the image sensor on a second device, distinct from the device.

3. The method of claim 1, wherein obtaining the image data characterizing the field of view captured using the image sensor includes obtaining the image data characterizing the field of view captured by the image sensor integrated into the device.

4. The method of claim 1, wherein the contextual trigger for the one of the plurality of contextual CGR digital assistants is identified in response to receiving an input from a user through an input device connected to or integrated into the device.

5. The method of claim 4, wherein:
the input device includes a gaze sensor configured to detect eye gaze; and
identifying in the image data the contextual trigger for the one of the plurality of contextual CGR digital assistants includes:
detecting the eye gaze of the user proximate to an object in the field of view; and
activating the contextual trigger associated with the object.

6. The method of claim 4, wherein:
the input device includes an audio input device; and
identifying in the image data the contextual trigger for the one of the plurality of contextual CGR digital assistants includes activating the contextual trigger according to input received using the audio input device.

7. The method of claim 4, wherein:
the input device includes an inertial measurement unit (IMU) to obtain body poses of the user; and
identifying in the image data the contextual trigger for the one of the plurality of contextual CGR digital assistants includes:
deriving from the body poses positions of body portions of the user, wherein the positions of body portions indicate an interest in a subject in the image data; and
activating the contextual trigger associated with the subject in the image data.

8. The method of claim 4, wherein:
the input device includes one or more cameras associated with an HMD worn by the user to obtain the field of view associated with the user; and
identifying in the image data the contextual trigger for the one of the plurality of contextual CGR digital assistants includes:
generating pose information for the user based on the field of view;
deriving from the pose information positions of body portions of the user, wherein the positions of body portions indicate an interest in a subject in the image data; and
activating the contextual trigger associated with the subject in the image data.

9. The method of claim 1, wherein the first contextual meaning represents a first expectation of the first visual representation in the context by the user according to the profile, and the second contextual meaning represents a second expectation of the second visual representation in the context by the user according to the profile.

10. The method of claim 1, wherein the context includes at least one of a calendar event associated with a user or a location of the device.

11. The method of claim 1, further comprising displaying on the one or more displays an animation of the first visual representation of the one of the plurality of contextual CGR digital assistants providing the information to the user, including adjusting the animation according to the context.

12. The method of claim 11, further comprising:
determining that the user has received the information; and
ceasing to display at least one of the animation or the first visual representation of the one of the plurality of contextual CGR digital assistants in the CGR scene.

13. The method of claim 1, further comprising providing audio output using a plurality of speakers, the audio output spatially corresponding to a location associated with the one of the plurality of contextual CGR digital assistants in the field of view.

14. The method of claim 1, wherein the device includes at least one of a head-mounted device, a mobile phone, a tablet, or a drone.

15. A device comprising:
one or more displays;
non-transitory memory; and
one or more processors to:
obtain image data characterizing a field of view captured by an image sensor;
identify in the image data a contextual trigger for one of a plurality of contextual CGR digital assistants, wherein the contextual trigger includes one or more objects associated with information in the image data;
in response to identifying the contextual trigger, select a first visual representation of the one of the plurality of contextual CGR digital assistants for a CGR scene based on context, a first contextual meaning of the first visual representation of the one of the plurality of contextual CGR digital assistants, and a profile of a user, wherein according to the profile, the first visual representation has the first contextual meaning in the context for providing the information to the user in the CGR scene;
present the CGR scene by displaying the first visual representation of the one of the plurality of contextual CGR digital assistants in the CGR scene to provide the information associated with the contextual trigger including the one or more objects to the user according to the context in the CGR scene;
select a second visual representation of the one of the plurality of contextual CGR digital assistants for the CGR scene, different from the first visual representation, wherein the second visual representation is selected based on the context, a second contextual meaning of the second visual representation in the context, and the profile; and
display the second visual representation in the CGR scene to provide the information.

16. The device of claim 15, wherein obtaining the image data characterizing the field of view captured by the image sensor includes receiving the image data characterizing the field of view captured using the image sensor on a second device, distinct from the device.

17. The device of claim 15, wherein obtaining the image data characterizing the field of view captured using the image sensor includes obtaining the image data characterizing the field of view captured by the image sensor integrated into the device.

18. A non-transitory memory storing one or more programs, which, when executed by one or more processors of a device with one or more displays, cause the device to perform operations comprising:
obtaining image data characterizing a field of view captured using an image sensor;
identifying in the image data a contextual trigger for one of a plurality of contextual computer-generated reality (CGR) digital assistants, wherein the contextual trigger includes one or more objects associated with information in the image data;
in response to identifying the contextual trigger, selecting a first visual representation of the one of the plurality of contextual CGR digital assistants for a CGR scene based on context, a first contextual meaning of the first visual representation of the one of the plurality of contextual CGR digital assistants, and a profile of a user, wherein according to the profile, the first visual representation has the first contextual meaning in the context for providing the information to the user in the CGR scene;

presenting the CGR scene by displaying the first visual representation of the one of the plurality of contextual CGR digital assistants in the CGR scene to provide the information associated with the contextual trigger including the one or more objects to the user according to the context in the CGR scene;

selecting a second visual representation of the one of the plurality of contextual CGR digital assistants for the CGR scene, different from the first visual representation, wherein the second visual representation is selected based on the context, a second contextual meaning of the second visual representation in the context, and the profile; and displaying the second visual representation in the CGR scene to provide the information.

19. The non-transitory memory of claim 18, wherein obtaining the image data characterizing the field of view captured by the image sensor includes receiving the image data characterizing the field of view captured using the image sensor on a second device, distinct from the device.

20. The non-transitory memory of claim 18, wherein obtaining the image data characterizing the field of view captured using the image sensor includes obtaining the image data characterizing the field of view captured by the image sensor integrated into the device.

* * * * *